US012176175B2

(12) United States Patent
Haraguchi et al.

(10) Patent No.: US 12,176,175 B2
(45) Date of Patent: Dec. 24, 2024

(54) ELECTRON BEAM GENERATION SOURCE, ELECTRON BEAM EMISSION DEVICE, AND X-RAY EMISSION DEVICE

(71) Applicant: HAMAMATSU PHOTONICS K.K., Hamamatsu (JP)

(72) Inventors: Dai Haraguchi, Hamamatsu (JP); Yoshito Hasegawa, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 200 days.

(21) Appl. No.: 17/917,977

(22) PCT Filed: Jan. 28, 2021

(86) PCT No.: PCT/JP2021/003083
§ 371 (c)(1),
(2) Date: Oct. 10, 2022

(87) PCT Pub. No.: WO2021/210237
PCT Pub. Date: Oct. 21, 2021

(65) Prior Publication Data

US 2023/0148363 A1 May 11, 2023

(30) Foreign Application Priority Data

Apr. 13, 2020 (JP) ................................ 2020-071470

(51) Int. Cl.
*H01J 35/06* (2006.01)

(52) U.S. Cl.
CPC ....... *H01J 35/064* (2019.05); *H01J 2235/064* (2013.01)

(58) Field of Classification Search
CPC .......................... H01J 35/064; H01J 2235/064
See application file for complete search history.

(56) References Cited

U.S. PATENT DOCUMENTS 2,656,480 A 10/1953 Corbell et al.
2018/0350549 A1 * 12/2018 Lampe ................. H01J 35/025

FOREIGN PATENT DOCUMENTS

EP 3413331 A1 12/2018
JP S61-264648 A 11/1986
JP H01-112553 U 7/1989
JP H08-264138 A 10/1996

(Continued)

OTHER PUBLICATIONS

JP 61-264648 A: English translation of specification and claims (Year: 1986).*

(Continued)

*Primary Examiner* — Chih-Cheng Kao
(74) *Attorney, Agent, or Firm* — Faegre Drinker Biddle & Reath LLP

(57) ABSTRACT

Disclosed is an electron beam generation source including: an electron discharge part extending on a desired axis and configured to discharge electrons; a movable part connected to one end of the electron discharge part; a support part configured to support the movable part to be movable along the axis; and a tension holding part configured to hold tension of the electron discharge part by applying a pressing force or a tensile force to the movable part. The movable part and the tension holding part are disposed on the axis.

10 Claims, 15 Drawing Sheets

(56) References Cited

FOREIGN PATENT DOCUMENTS

| | | | |
|---|---|---|---|
| JP | 2000-066000 | A | 3/2000 |
| JP | 2002-093350 | A | 3/2002 |
| JP | 2002-157966 | A | 5/2002 |
| JP | 2004-077269 | A | 3/2004 |
| WO | WO-96/009640 | A1 | 3/1996 |

OTHER PUBLICATIONS

International Preliminary Report on Patentability mailed Oct. 27, 2022 for PCT/JP2021/003083.

* cited by examiner

ELECTRON BEAM GENERATION SOURCE, ELECTRON BEAM EMISSION DEVICE, AND X-RAY EMISSION DEVICE

TECHNICAL FIELD

The present disclosure relates to an electron beam generation source, an electron beam emission device, and an X-ray emission device.

BACKGROUND ART

A fluorescent display tube that discharges electrons from an electron discharge part toward a phosphor to emit light from the phosphor is described in Patent Literature 1. In an electron beam generation source of this fluorescent display tube, tension of the electron discharge part is held by applying a pressing force of a tension holding part (a spring) to the electron discharge part having a linear shape.

CITATION LIST

Patent Literature

[Patent Literature 1] Japanese Unexamined Patent Publication No. H8-264138

SUMMARY OF INVENTION

Technical Problem

In the above fluorescent display tube, the electron discharge part having a linear shape and the tension holding part are disposed parallel to each other, and ends of both are connected by a connecting part, and thus the pressing force of the tension holding part is applied to the electron discharge part. In such a configuration, it is difficult to apply the pressing force of the tension holding part to the electron discharge part along an axis of the electron discharge part, and axial deviation of the electron discharge part may occur due to action of a moment.

Therefore, an object of the present disclosure is to provide an electron beam generation source, an electron beam emission device, and an X-ray emission device in which a pressing force or a tensile force of a tension holding part can be appropriately applied to an electron discharge part to curb axial deviation of the electron discharge part.

Solution to Problem

According to an aspect of the present disclosure, there is provided an electron beam generation source including: an electron discharge part extending on a desired axis and configured to discharge electrons; a movable part connected to one end of the electron discharge part; a support part configured to support the movable part to be movable along the axis; and a tension holding part configured to hold tension of the electron discharge part by applying a pressing force or a tensile force to the movable part, wherein the movable part and the tension holding part are disposed on the axis.

In this electron beam generation source, the electron discharge part, the movable part, and the tension holding part are provided on the same axis. Therefore, the electron beam generation source can easily apply the pressing force or the tensile force of the tension holding part to the electron discharge part in an axial direction via the movable part. As a result, even in a case where the pressing force or the tensile force of the tension holding part is applied, axial deviation of the electron discharge part is curbed. In this way, the electron beam generation source can appropriately apply the pressing force or the tensile force of the tension holding part to the electron discharge part to curb the axial deviation of the electron discharge part.

The tension holding part may apply the pressing force or the tensile force to the movable part such that the movable part moves along the axis. In this case, the electron beam generation source can further curb the axial deviation of the electron discharge part in a case where the pressing force or the tensile force of the tension holding part is applied.

The movable part may be disposed such that a position of a center of gravity of the movable part is positioned on the axis. In this case, even in a case where the pressing force or the tensile force of the tension holding part is applied, the movable part swinging due to action of a moment is curbed. As a result, the electron beam generation source can further curb the axial deviation of the electron discharge part.

The electron discharge part and the tension holding part may be made of different members. In this case, the electron beam generation source can curb the conduction of heat from the electron discharge part to the tension holding part and can curb the heating of the tension holding part.

The support part may include a housing part having an internal space for accommodating the tension holding part inside. In this case, the electron beam generation source can curb the influence of the radiant heat from the electron discharge part on the tension holding part by the housing part provided in the support part. As a result, the electron beam generation source can curb fluctuations in the pressing force or the tensile force of the tension holding part due to the influence of heat and deterioration due to heat and can stably hold the tension of the electron discharge part.

The housing part may cover the tension holding part such that the tension holding part cannot be directly seen from the electron discharge part. In this case, the electron beam generation source can prevent the electrons discharged from the electron discharge part from directly hitting the tension holding part and can curb heating deterioration and damage caused by the collision of the electrons.

The housing part may include a movable part holding part that extends along the axis and holds the movable part to be movable along the axis. In this case, the housing part can stably hold the movable part to be movable by the movable part holding part.

The movable part holding part may be a through hole extending along the axis and having a circular column shape. In this case, the movable part can rotate in the through hole. For example, when the tension holding part expands and contracts, the tension holding part is twisted, and thus a force in a rotational direction may be applied to the movable part. Even in this case, the rotation of the movable part in the through hole curbs the concentration of a force of the twisting on a part of the movable part, and the tension of the electron discharge part is maintained. As a result, the electron beam generation source can curb the influence of the twisting even in a case where the tension holding part is twisted.

The electron discharge part may have a straight linear shape. In this case, the electron beam generation source can uniformly emit electrons at each position in an axial direction.

The electron discharge part may have a coiled part having a coiled shape. In this case, the electron beam generation source can have a function of holding tension with respect to the electron discharge part.

The electron beam generation source may further include a frame configured to support the other end of the electron discharge part and the tension holding part. In this case, the electron beam generation source can be easily handled by making the electron beam generation source into one body using the frame.

There may be provided an electron beam emission device including: such an electron beam generation source; a main body configured to accommodate the electron beam generation source; and an electron extraction part configured to extract electrons from the electron beam generation source to the outside of the main body. Further, there may be provided an X-ray emission device including: such an electron beam generation source; a main body configured to accommodate the electron beam generation source; an X-ray generation part configured to generate X-rays when electrons are incident from the electron beam generation source; and an X-ray extraction part configured to extract the X-rays to the outside of the main body. In this case, it is possible to obtain an electron beam emission device and an X-ray emission device capable of curbing the axial deviation of the electron discharge part.

Advantageous Effects of Invention

According to the present disclosure, a pressing force or a tensile force of a tension holding part can be appropriately applied to an electron discharge part to curb axial deviation of the electron discharge part.

DESCRIPTION OF EMBODIMENTS

Figure 1:
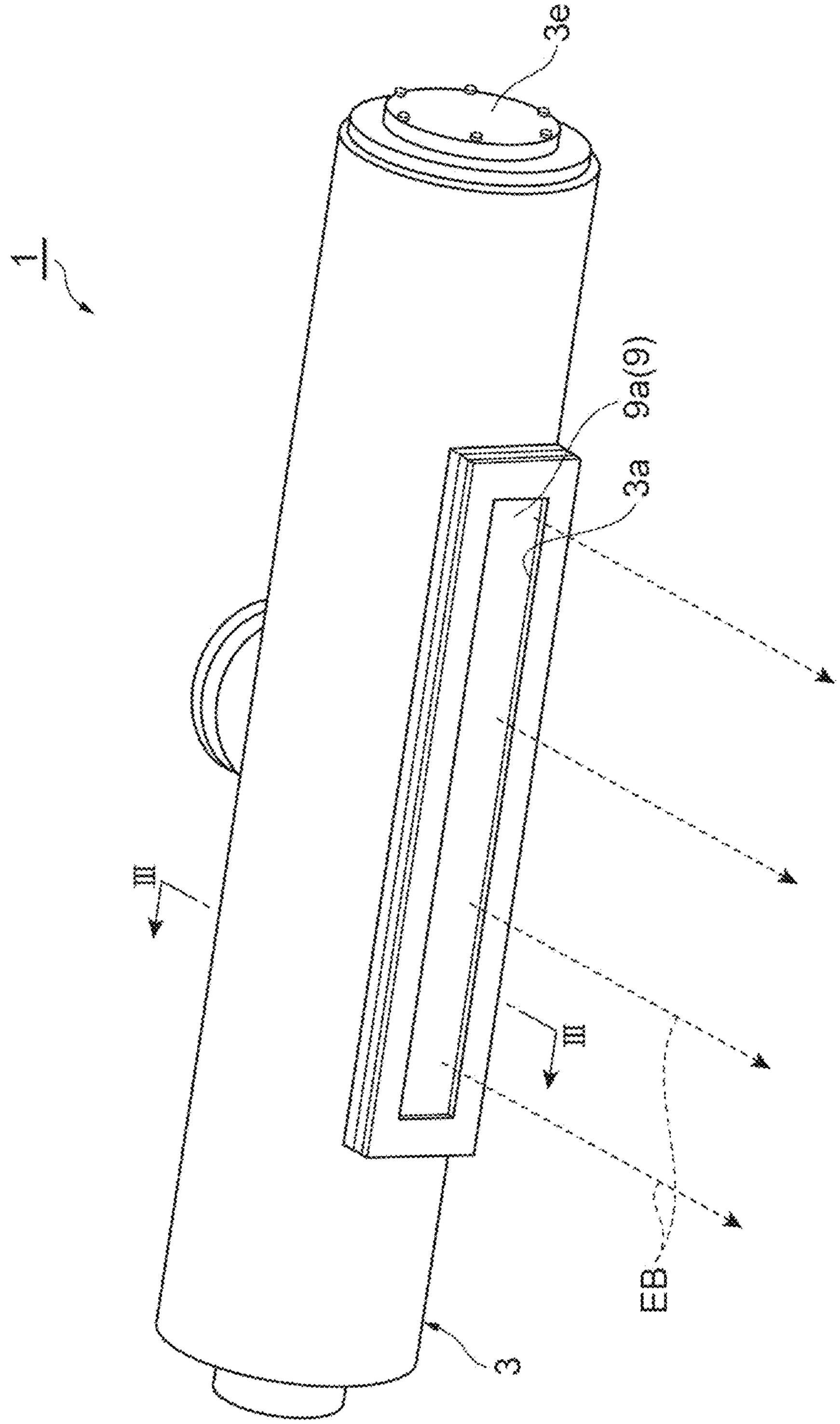
FIG. 1 is a perspective view of an electron beam emission device according to an embodiment.

Hereinafter, an embodiment of the present disclosure will be described with reference to the drawings. In the drawings, the same or corresponding elements will be denoted by the same reference signs and redundant description will be omitted.

An electron beam emission device 1 shown in FIG. 1 is used for, for example, ink curing, sterilizing, or surface reforming on an irradiation target by irradiating the irradiation target with electron beams EB. Hereinafter, an electron beam emitting side (a side of a window 9) which is a side from which the electron beams EB are emitted by the electron beam emission device 1 will be described as a "front side."

Figure 2:
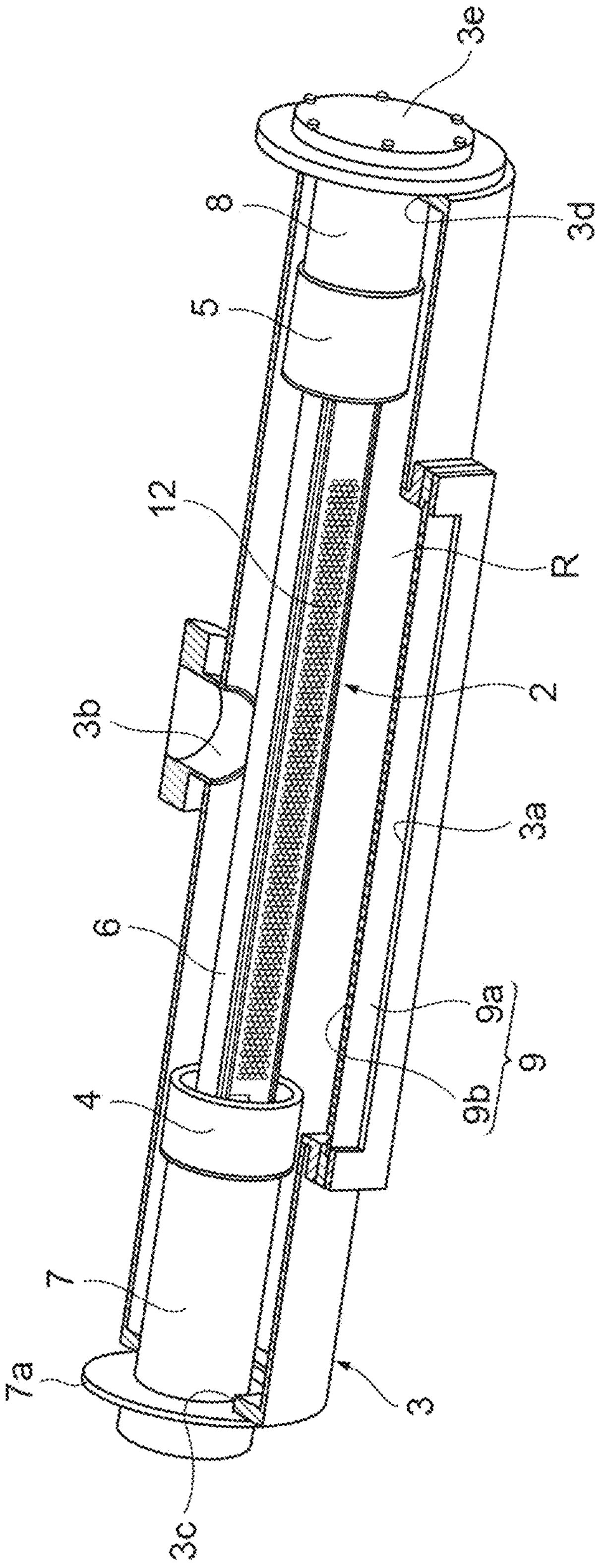
FIG. 2 is a partial cross-sectional view showing an internal structure of the electron beam emission device of FIG. 1.
Figure 3:
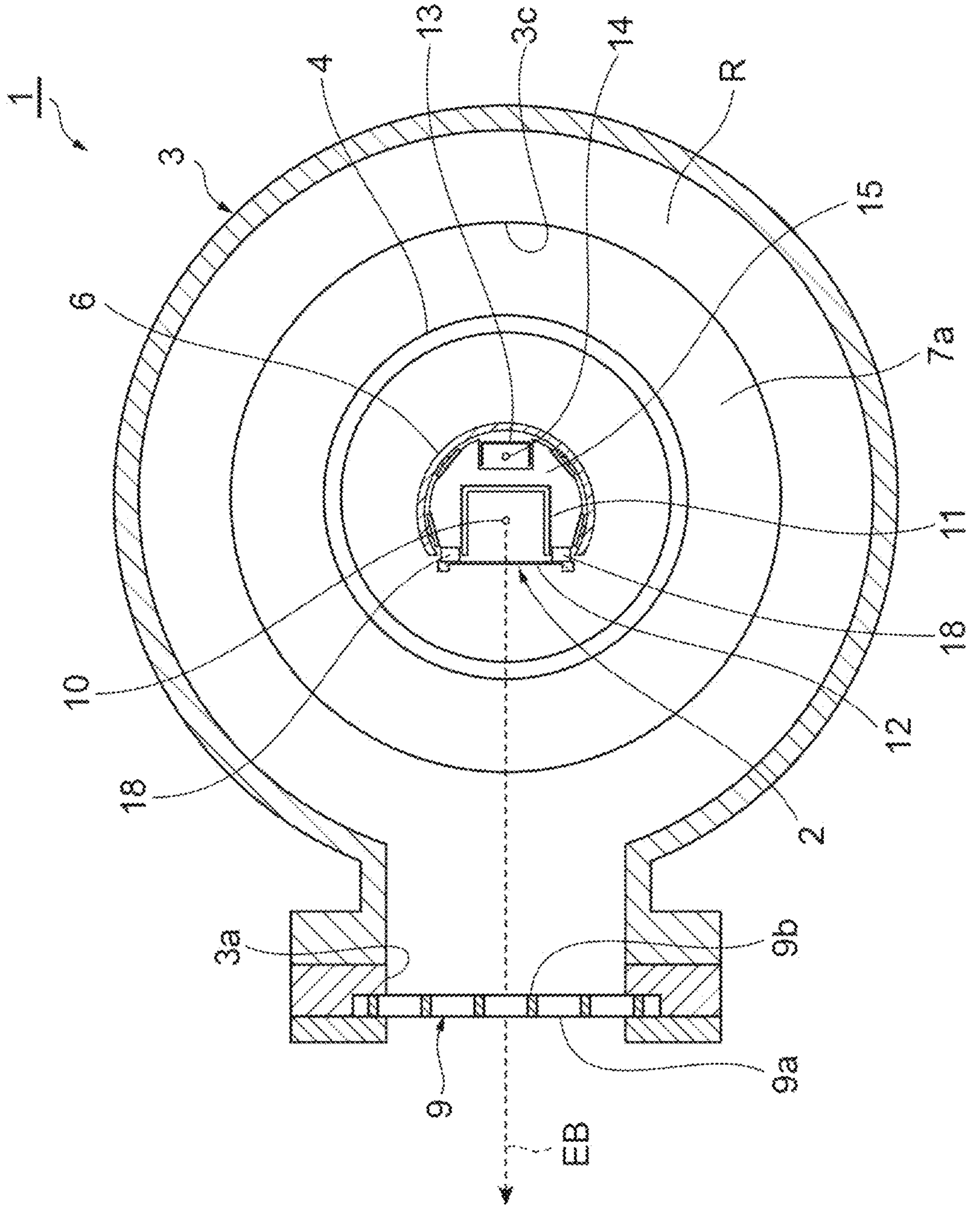
FIG. 3 is a cross-sectional view along line III-III of FIG. 1.

As shown in FIGS. 1 to 3, the electron beam emission device 1 includes a filament unit (an electron beam generation source) 2, a vacuum container (a main body) 3, a cathode holding member 4, a cathode holding member 5, a rail 6, a high voltage introduction insulation member 7, an insulation support member 8, and a window (an electron extraction part) 9. The filament unit 2 is an electron beam generation unit that generates the electron beams EB. Further, the filament unit 2 is a long unit.

The vacuum container 3 is formed of a conductive material such as a metal. The vacuum container 3 has a substantially cylindrical shape. The vacuum container 3 forms a vacuum space R having a substantially circular column shape inside. The filament unit 2 is disposed inside the vacuum container 3 in an axial direction (a major axis direction) of the vacuum space R having a substantially circular column shape. An opening 3*a* through which the vacuum space R and an external space communicate with each other is provided at a position on the front side in the vacuum container 3 with respect to the filament unit 2. The window 9 is fixed to the opening 3*a* to be vacuum-sealed.

The window 9 includes a window material 9*a* and a support 9*b*. The window material 9*a* is formed in a thin film shape. As a material of the window material 9*a*, a material having excellent transparency for the electron beams EB (for example, beryllium, titanium, aluminum, or the like) is used. The support 9*b* is disposed on a side of the vacuum space R of the window material 9*a* and supports the window material 9*a*. The support 9*b* is a mesh-like member and has a plurality of holes through which the electron beams EB pass.

An exhaust port 3*b* for exhausting air in the vacuum container 3 is provided at a position on a rear side in the vacuum container 3 with respect to the filament unit 2. A vacuum pump (not shown) is connected to the exhaust port 3*b*, and the air in the vacuum container 3 is discharged by the vacuum pump. As a result, the inside of the vacuum container 3 becomes the vacuum space R. In both ends of the vacuum container 3 having a substantially cylindrical shape, an opening 3*c* on the other side and an opening 3*d* on one side are closed by a flange 7*a* of the high voltage introduction insulation member 7 and a lid 3*e*, respectively.

A pair of cathode holding members 4 and 5 that have a cathode potential are disposed in the vacuum container 3. The rail 6 which has a cathode potential and also serves as a surrounding electrode that surrounds the filament unit 2 is provided between the cathode holding member 4 on the other side and the cathode holding member 5 on one side. The rail 6 is a conductive and long member having a substantially C-shaped cross section. The rail 6 is disposed such that an opening having a substantially C-shaped cross section faces the front side (a side of the window 9). The rail 6 holds the filament unit 2 in an inside portion (an inside space). For example, the filament unit 2 is held in the rail 6 by being inserted into the inside of the rail 6 through insertion holes provided in the cathode holding member 5 and the insulation support member 8 in a state where the lid 3*e* of the vacuum container 3 is removed.

The high voltage introduction insulation member 7 is provided at an end of the vacuum container 3 on a side of the opening 3*c* on the other side. The other end of the high voltage introduction insulation member 7 projects to the outside of the vacuum container 3 through the opening 3*c*. The high voltage introduction insulation member 7 has the flange 7*a* protruding outward in a radial direction thereof and seals the opening 3*c* of the vacuum container 3. The high voltage introduction insulation member 7 is formed of an insulation material (for example, an insulation resin such as an epoxy resin, ceramic, or the like). The cathode holding member 4 holds one end of the high voltage introduction insulation member 7 in a state where the cathode holding member 4 is electrically insulated from the vacuum container 3 which has a ground potential.

Further, the high voltage introduction insulation member 7 is a high withstand voltage type connector for receiving supply of a high voltage from a power source device outside the electron beam emission device 1. A plug (not shown) for supplying a high voltage from the power source device is inserted into the high voltage introduction insulation member 7. An internal wiring for supplying a high voltage supplied from the outside to the filament unit 2 and the like is provided inside the high voltage introduction insulation member 7. This internal wiring is covered with an insulation material constituting the high voltage introduction insulation member 7, and insulation with respect to the vacuum container 3 is ensured.

The insulation support member 8 is provided at an end of the vacuum container 3 on a side of the opening 3*d* on the one side (an end on a side of the lid 3*e*). The insulation support member 8 is formed of an insulation material (for example, an insulation resin such as an epoxy resin, ceramic, or the like). The cathode holding member 5 holds the other end of the insulation support member 8 in a state where the cathode holding member 5 is electrically insulated from the vacuum container 3.

Figure 4:
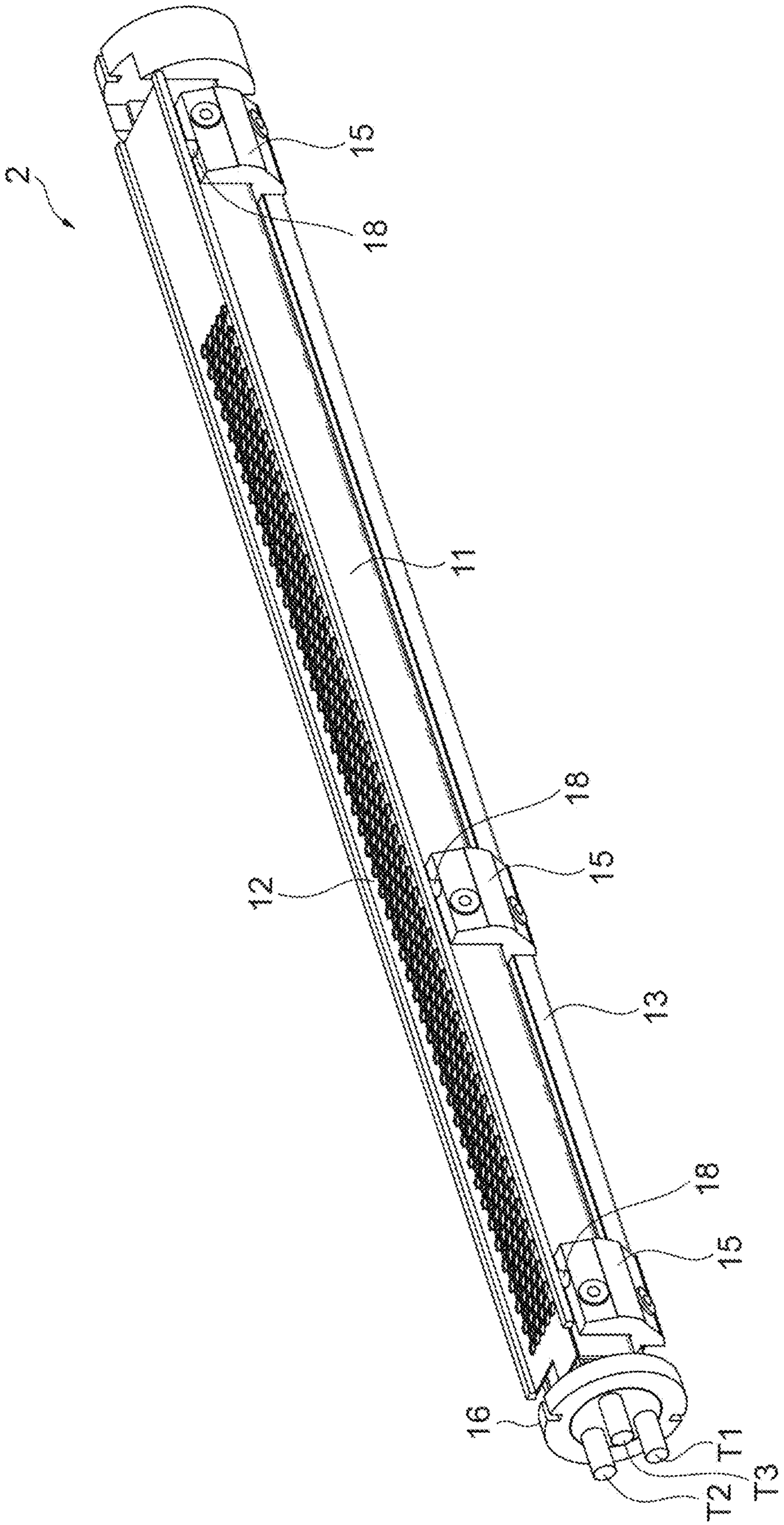
FIG. 4 is a perspective view of a filament unit.
Figure 5:
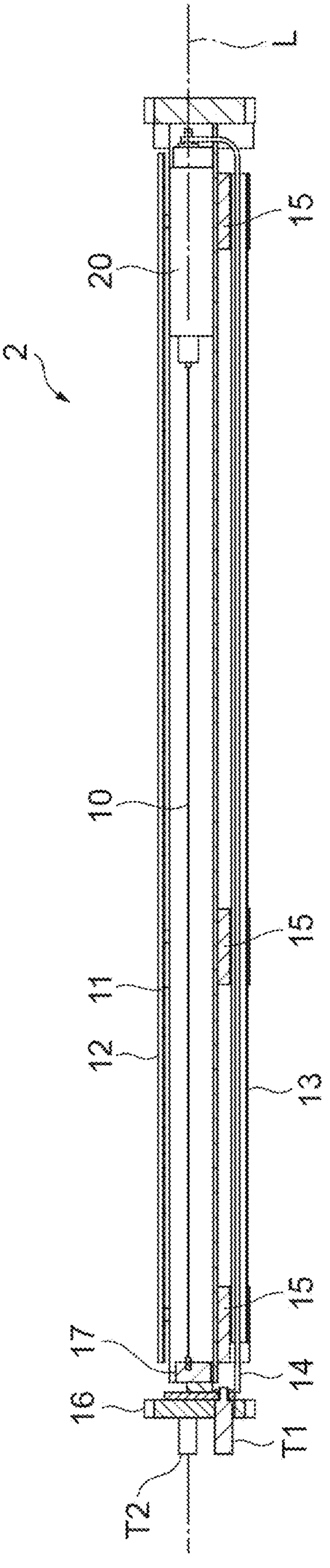
FIG. 5 is a cross-sectional view of the filament unit.

As shown in FIGS. 3 to 5, the filament unit 2 is configured as one unit to be attachable to and detachable from the rail 6. The filament unit 2 includes a filament (an electron discharge part) 10, a main frame (a frame) 11, a grid electrode 12, a sub frame 13, a power supply line 14, a guide member 15, a terminal holding member 16, a filament fixing member 17, and a tension holding unit 20.

The main frame 11 is a long member having a substantially U-shaped (C-shaped) cross section. The main frame 11 is disposed such that an opening having a substantially U-shaped cross section faces the front side (a side of the window 9). The filament fixing member 17 is provided at the other end of the main frame 11 in the inside (an inside space) of the main frame 11. Further, the tension holding unit 20 is provided at one end of the main frame 11 in the inside (the inside space) of the main frame 11.

The filament 10 is an electron discharge part that discharges electrons that become the electron beams EB when heated by energization. The filament 10 is a linear member and extends on a desired axis L extending from one side to the other side. The filament 10 is formed of a metal material having a high melting point, for example, a material containing tungsten as a main component. One end of the filament 10 is connected to the tension holding unit 20. The other end of the filament 10 is connected to the filament fixing member 17. As described above, the main frame 11 supports the tension holding unit 20 connected to the one end of the filament 10 and the filament fixing member 17 connected to the other end of the filament 10.

The terminal holding member 16 is attached to the other end of the main frame 11. The terminal holding member 16 holds a filament terminal T1 for supplying a current for the filament 10 to discharge electrons, a high voltage terminal T2 for supplying a cathode potential to the filament unit 2, and a grid electrode terminal T3 for supplying an applied voltage to the grid electrode 12 in a state where the terminals T1, T2, and T3 are electrically insulated from each other. The filament terminal T1 is connected to the other end of the power supply line 14. The high voltage terminal T2 is electrically connected to the filament fixing member 17.

The sub frame 13 is a long member having a substantially U-shaped cross section. The sub frame 13 is disposed parallel to the main frame 11. The power supply line 14 is connected to the tension holding unit 20 from a connection position with the filament terminal T1 through the inside (an inside space) of the sub frame 13. The sub frame 13 has a protective function for the power supply line 14. The main frame 11 and the sub frame 13 are connected to each other by a plurality of guide members 15. An outer surface of the guide member 15 is slidably in contact with an inner surface of the rail 6.

The grid electrode 12 is disposed on the front side with respect to the filament 10 and is supported by the guide member 15 via an insulation member 18. A plurality of holes are formed in the grid electrode 12 (see FIG. 4 and the like). The grid electrode 12 is electrically connected to the grid electrode terminal T3 via a wiring (not shown).

The tension holding unit 20 holds tension of the filament 10. Here, the tension holding unit 20 can hold the tension of the filament 10 by pressing or pulling a movable body connected to the one end of the filament 10 by a spring. In the present embodiment, the tension holding unit 20 holds the tension of the filament 10 by pulling the movable body by the spring. The tension holding unit 20 is attached to the main frame 11 in a state where the tension holding unit 20 is electrically insulated from the main frame 11 via an insulation member or the like. One end of the power supply line 14 is connected to the tension holding unit 20. The tension holding unit 20 can supply the electric power supplied via the power supply line 14 to the filament 10 while holding the tension of the filament 10.

The filament unit 2 is inserted into the inside (the inside space) of the rail 6 through the insertion holes provided in the cathode holding member 5 and the insulation support member 8 with the other end provided with the filament terminal T1 or the like as a head and is fixed thereto. At a position where the filament unit 2 has been inserted, tip ends of the filament terminal T1, the high voltage terminal T2, and the grid electrode terminal T3 are in contact with tip ends of three connection terminals provided in the high voltage introduction insulation member 7. As a result, the filament terminal T1 and the like are electrically connected to the connection terminals provided in the high voltage introduction insulation member 7.

The filament 10 discharges electrons when a high negative voltage such as minus several tens of kV to minus several hundreds of kV is applied in a state where the filament 10 is heated by energization. A predetermined voltage is applied to the grid electrode 12. For example, a voltage on a positive side of about 100 V to 150 V with respect to the negative voltage applied to the filament 10 may be applied to the grid electrode 12. The grid electrode 12 forms an electric field for drawing out electrons and curbing diffusion of the electrons. As a result, the electrons discharged from the filament 10 are emitted to the front side as the electron beams EB from the holes provided in the grid electrode 12.

Next, the details of the tension holding unit 20 for holding the tension of the filament 10 will be described with reference to FIGS. 6 and 7. In the following description, for convenience of explanation, a side (the other side) on which the filament 10 is provided with respect to the tension holding unit 20 is referred to as a "left side," and a side (one side) on which the tension holding unit 20 is provided with respect to the filament 10 is referred to as a "right side." That is, a left-right direction is a direction along the axis L extending from the one side to the other side.

Figure 6:
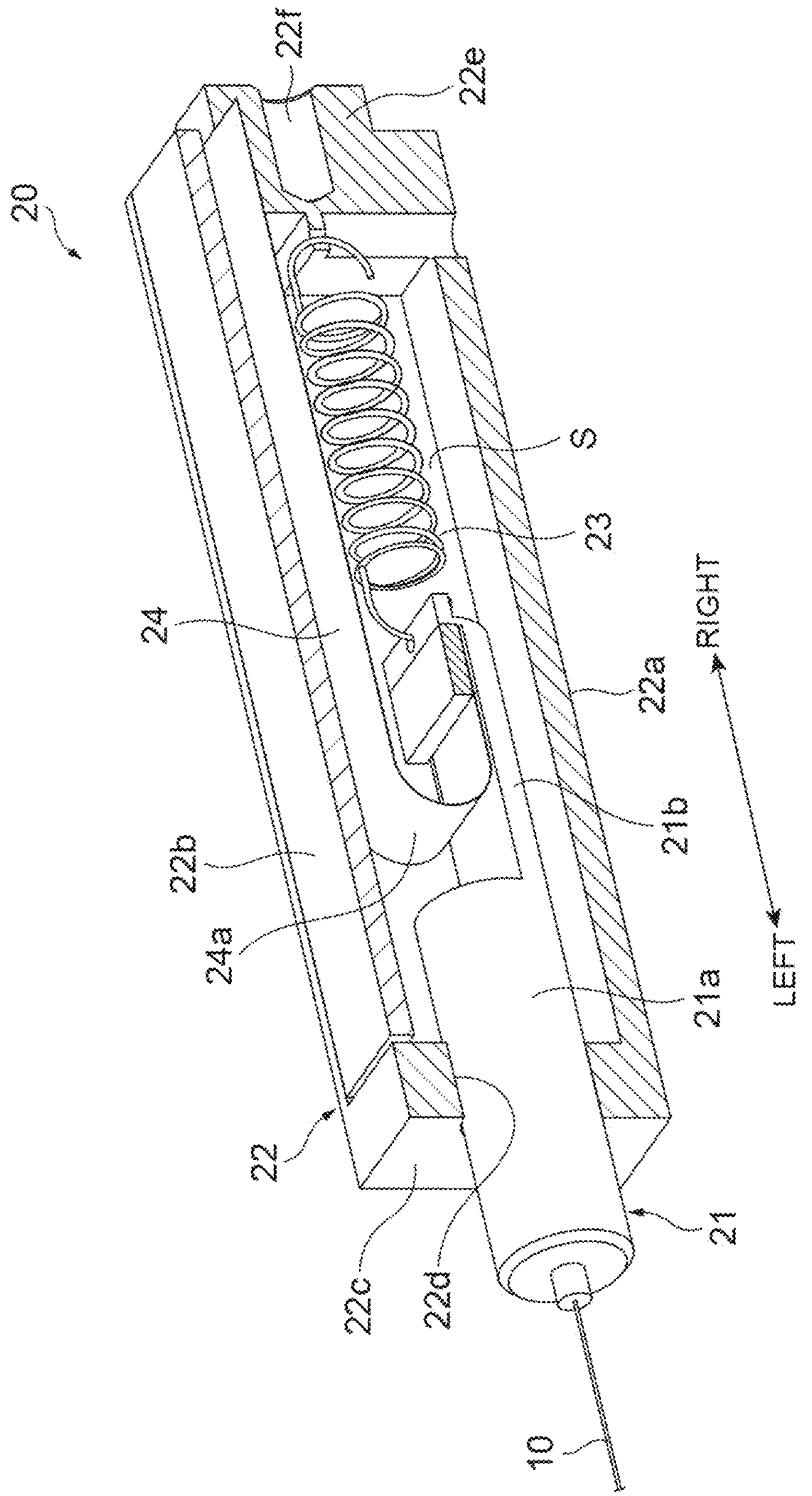
FIG. 6 is a cross-sectional perspective view of a tension holding unit.
Figure 7:
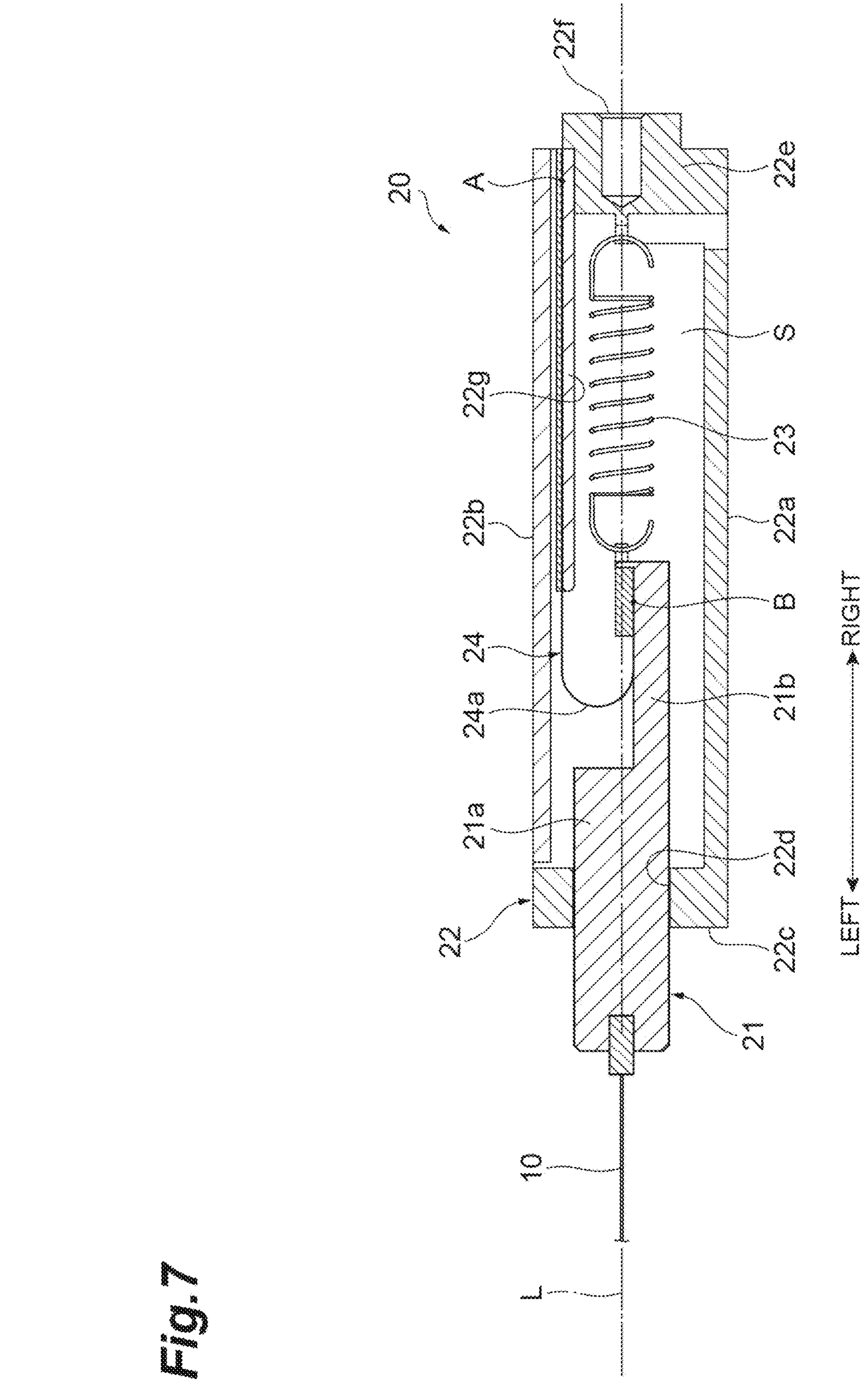
FIG. 7 is a cross-sectional view of the tension holding unit.

As shown in FIGS. 6 and 7, the tension holding unit 20 includes a movable body (a movable part) 21, a housing (a support part, a housing part) 22, a spring (a tension holding part) 23, and a foil material (a power supply path part) 24. The movable body 21 is connected to the one end of the filament 10. The movable body 21 has a circular column 21*a* and a connection part 21*b*. The circular column 21*a* has a circular column shape extending in the left-right direction. The one end of the filament 10 is fixed to an end of the circular column 21*a* on the left side. As a method for fixing the circular column 21*a* and the filament 10 to each other, various methods can be adopted. The connection part 21*b* is connected to an end of the circular column 21*a* on the right side. The other end of the spring 23 and the other end of the foil material 24 are connected to the connection part 21*b*. The movable body 21 is formed of a conductive material. The movable body 21 is formed of, for example, a material such as stainless steel, copper, or a copper alloy.

The movable body 21 is provided on the axis L. A state in which the movable body 21 is provided on the axis L is a disposition state in which the axis L is positioned inside an outer edge of the movable body 21 when viewed from the direction along the axis L. The same intention applies to a state in which other members are provided on the axis L. Further, the movable body 21 may be disposed such that a position of a center of gravity of the movable body 21 is positioned on the axis L.

The housing 22 is a box body having an accommodation space (an internal space) S inside. The spring 23, the foil material 24, and the end of the movable body 21 on the right side are accommodated in the accommodation space S of the housing 22. The housing 22 may be constituted by a box part 22*a* having an open surface such that the spring 23 and the like can be accommodated in the accommodation space S and a lid 22*b* covering an opening of the box part 22*a*. A guide hole (a movable part holding part) 22*d* is provided in a filament side wall 22*c* (a wall on the left side which constitutes the housing 22) which is a wall of the housing 22 on a side of the filament 10 (the other side). The guide hole 22*d* extends along the axis L. Further, the guide hole 22*d* is a through hole having a circular column shape extending along the axis L. A diameter of the guide hole 22*d* is larger than a diameter of the circular column 21*a* of the movable body 21 by a desired value. The guide hole 22*d* guides the circular column 21*a* of the movable body 21 to be movable along the axis L. That is, the housing 22 holds the movable body 21 to be movable along the axis L by the guide hole 22*d*.

A power supply line connection part 22*f* to which the one end of the power supply line 14 is connected is provided in a power supply side wall 22*e* (a wall on the right side constituting the housing 22) which is a wall on a side (the one side) opposite to a side of the filament 10 in the housing 22. For example, the end of the power supply line 14 is electrically connected to the housing 22 by a bolt at the power supply line connection part 22*f*. As a result, the housing 22 is electrically connected to a power source device (a power supply device) that supplies power to the filament 10 via the power supply line 14 and the like. The housing 22 is formed of a conductive material. The housing 22 is formed of, for example, a material such as stainless steel, copper, or a copper alloy.

The spring 23 is accommodated in the accommodation space S of the housing 22. The spring 23 is provided on the axis L. The other end of the spring 23 is connected to an end of the connection part 21*b* on the right side. A connection position between the spring 23 and the connection part 21*b* is positioned on the axis L. One end of the spring 23 is connected to the power supply side wall 22*e* of the housing 22. The housing 22 covers the spring 23 such that the spring 23 cannot be seen directly from the filament 10. A connection position (a connection portion) between the spring 23 and the movable body 21 is positioned in the accommodation space S.

The spring 23 is a tension spring. The spring 23 applies a tensile force to the movable body 21 such that the movable body 21 moves along the axis L. That is, the spring 23 pulls the movable body 21 in one side direction along the axis L from the connection position to the movable body 21. The movable body 21 connects the one end of the filament 10 and the other end of the spring 23 to each other. As a result, the spring 23 pulls the filament 10 via the movable body 21 by applying a tensile force to the movable body 21 and holds the tension of the filament 10. The spring 23 is formed of, for example, a material such as stainless steel or Inconel. The spring 23 may be formed of a material which is different from the filament 10. A load of the spring 23 needs to be in a desired range during an operation (when the filament 10 is energized), and if the load deviates from that range, problems such as loosening, plastic deformation, and disconnection of the filament 10 may occur. Therefore, when the load of the spring 23 is Fa, an allowable tensile load of the filament 10 is Fx, and the sum of a weight and a frictional force of the movable body 21 is Fy, a relationship of $Fx+Fy>Fa$ needs to be established. Further, it should be noted that the heating of the filament 10 by energization causes a relationship of the allowable tensile load of the filament 10, that is, the allowable tensile load Fx1 at a room temperature>the allowable tensile load Fx2 at the time of heating. Therefore, the load of the spring 23 is preferably in the range of 0.01 N to 1000 N, more preferably 0.01 N to 100 N, and even more preferably 0.1 N to 10 N.

The foil material 24 is accommodated in the accommodation space S of the housing 22. The foil material 24 serves as a power supply path for supplying the electric power supplied to the housing 22 via the power supply line 14 to the movable body 21. One end of the foil material 24 is connected to the power supply side wall 22*e* of the housing 22, and the other end of the foil material 24 is connected to the connection part 21*b* of the movable body 21. A connection portion between the foil material 24 and the movable body 21 is positioned in the accommodation space S. As a result, the foil material 24 is electrically connected to the filament 10 via the movable body 21. The foil material 24 is formed of a material having a better electrical conductivity than the spring 23. That is, an electric resistance value of the spring 23 is larger than an electric resistance value of the foil material 24. The foil material 24 is formed of, for example, copper or the like as a material having a good electrical conductivity and a good flexibility. For example, in a case where the spring 23 is formed of stainless steel, the electric resistance is about 6Ω. For example, copper is used as the material of the foil material 24, and a length thereof is, for example, 50 mm. An electrical resistivity of copper is $1.7\times10^{-8}$Ω·m. Therefore, if a cross-sectional area of the foil material 24 is $1.4\times10^{-2}$ $mm^2$ or more, the electric resistance value of the foil material 24 can be sufficiently lowered to 1/100 or less of the electric resistance value of the spring 23 formed of stainless steel.

The foil material 24 is a thin film shaped member formed of a metal (a metal thin film part). A thickness of the foil material 24 is thinner than a width of the foil material 24, and the width of the foil material 24 is smaller than a length of the foil material 24. The foil material 24 extends from the power supply side wall 22*e* toward the movable body 21 and is fixed to the connection part 21*b* in a state where a tip end is folded back in a U shape. As described above, the foil material 24 has a folded-back part 24*a* which is folded back in a U shape and includes regions which are overlapped each other (doubled) in a positional relationship along the axis L at an end on the left side thereof, and the regions are separated from each other in a direction perpendicular to the axis L. Therefore, the length of the foil material 24 is longer than that of the spring 23 and longer than a length (a length of a straight line) from a connection position A between the foil material 24 and the power supply side wall 22*e* to a connection position B between the foil material 24 and the movable body 21. As a result, even in a case where the movable body 21 moves along the axis L, the position of the folded-back part 24*a* moves in the foil material 24 (the doubled regions become larger or smaller), and thus the foil material 24 can maintain a state in which the power supply side wall 22*e* and the movable body 21 are connected to each other while allowing the movable body 21 to move.

As shown in FIG. 7, the housing 22 may further include a partitioning part 22*g* in which one end is fixed to the power supply side wall 22*e* and the other end extends toward the movable body 21. The partitioning part 22*g* extends from the end of the spring 23 on the left side to the end of the spring 23 on the left side to place the foil material 24 in a state where the partitioning part 22*g* is separated from the spring 23 and partitions the spring 23 and the foil material 24 from each other. As a result, the foil material 24 is prevented from coining into contact with the spring 23.

In this way, the tension holding unit 20 can maintain the tension of the filament 10 with the tensile force of the spring 23. Further, a length (a free length) of the spring 23 is such that a tensile force can be applied to the movable body 21 even in a case where a length of the filament 10 becomes longer due to thermal expansion. For example, in a case where the material forming the filament 10 is tungsten, when the filament 10 having a total length of 500 mm is heated to 2000° C., the filament 10 becomes longer by about 5 mm due to thermal expansion with a coefficient of linear expansion of tungsten of $5.2\times10^{-6}$ [1/K] (2000° C.). Therefore, in order to absorb the thermal expansion length of the filament 10, the movable body 21 needs to be able to move by at least about 5 mm. In addition, it is more preferable to secure a moving range in consideration of thermal expansion of peripheral members (for example, the main frame 11). As a result, the tension holding unit 20 can maintain the tension of the filament 10 with the tensile force of the spring 23 even in a case where the length of the filament 10 changes due to thermal expansion. In this way, a state where the filament 10 is stretched in a straight linear shape by the tension holding unit 20 is maintained.

Further, in the tension holding unit 20, the power supply side wall 22*e* to which the power supply line 14 is connected and the movable body 21 to which the filament 10 is connected are connected to each other by the spring 23 and the foil material 24. Here, the foil material 24 is formed of a material having a better electrical conductivity than the spring 23. As a result, the electric power is supplied from the power supply side wall 22*e* to the movable body 21 mainly through the foil material 24 rather than the spring 23. As a result, heat generation of the spring 23 due to energization is curbed, and thus fluctuations in the tensile force, deterioration, or the like of the spring 23 due to the influence of heat is curbed. In this way, the tension holding unit 20 can hold the tension of the filament 10 by the spring 23 while supplying the electric power to the filament 10 through the foil material 24 via the movable body 21. More specifically, since the electric power supply to the filament 10 is performed via the movable body 21, the movable body 21 is in charge of rubbing or the like due to the mechanical sliding operation caused by the expansion and contraction of the spring 23, and thus it is possible to curb the influence on the holding of the tension of the filament 10 by the spring 23 and the electric power supply to the filament 10 by the foil material 24 while curbing the mechanical damage to the filament 10.

As described above, in the electron beam emission device 1 (the filament unit 2), the filament 10, the movable body 21, and the spring 23 are provided on the same axis L. Therefore, the electron beam emission device 1 can easily apply the tensile force of the spring 23 to the filament 10 via the movable body 21 in the direction of the axis L. As a result, even in a case where the tensile force of the spring 23 is applied, axial deviation (deviation from the axis L) of the filament 10 is curbed. In this way, the electron beam emission device 1 can appropriately apply the tensile force of the spring 23 to the filament 10 to curb the axial deviation of the filament 10. As a result, it is possible to obtain more uniform electron discharge distribution.

The spring 23 applies a tensile force to the movable body 21 such that the movable body 21 moves along the axis L. In this case, the electron beam emission device 1 can further curb the axial deviation of the filament 10 in a case where the tensile force of the spring 23 is applied.

In a case where the position of a center of gravity of the movable body 21 is disposed to be positioned on the axis L, even in a case where the tensile force of the spring 23 is applied, the movable body 21 swinging due to action of a moment is curbed. As a result, the electron beam emission device 1 can further curb the axial deviation of the filament 10.

Since the filament 10 and the spring 23 are formed of different members, the electron beam emission device 1 can curb the conduction of heat from the filament 10 to the spring 23 and can curb the heating of the spring 23.

The spring 23 is accommodated in the accommodation space S of the housing 22. In this case, the electron beam emission device 1 can curb the influence of the radiant heat from the filament 10 on the spring 23. As a result, the electron beam emission device 1 can curb fluctuations in the tensile force of the spring 23 due to the influence of heat and deterioration due to heat and can stably hold the tension of the filament 10.

The housing 22 covers the spring 23 such that the spring 23 cannot be seen directly from the filament 10. In this case, the electron beam emission device 1 can prevent the electrons discharged from the filament 10 from directly hitting the spring 23 and can curb heating deterioration and damage caused by the collision of the electrons.

The housing 22 is provided with the guide hole 22*d* extending along the axis L and holding the movable body 21 to be movable along the axis L. In this case, the housing 22 can stably hold the movable body 21 to be movable by the guide hole 22*d*.

The guide hole 22*d* is a through hole having a circular column shape extending along the axis L. In this case, the movable body 21 can rotate in the guide hole 22*d*. As a result, in the tension holding unit 20, for example, even if the spring 23 is twisted at the time of expansion and contraction of the spring 23 and a force in a rotational direction is applied to the movable body 21, it is possible to hold the tension of the filament 10 while curbing the concentration of a force of the twisting on a part of the movable body 21 by the rotation of the movable body 21 in the guide hole 22*d*. As a result, the electron beam emission device 1 can curb the influence of the twisting even in a case where the spring 23 is twisted.

The filament 10 has a straight linear shape due to the tension being held by the tension holding unit 20. In this case, the electron beam emission device 1 can uniformly emit electrons at each position in the direction of the axis L.

The filament unit 2 includes the main frame 11 that holds the tension holding unit 20 to which the one end of the filament 10 is connected and the filament fixing member 17 to which the other end of the filament 10 is connected. In this case, the filament unit 2 can be easily handled by making the filament unit 2 into one body using the main frame 11. Further, since the filament unit 2 can be attached to and detached from the rail 6 of the electron beam emission device 1, and the filament 10 and the tension holding unit 20 are attached to and detached from the rail 6 of the electron beam emission device 1 together with the filament unit 2.

Next, various modification examples of the tension holding unit provided in the electron beam emission device 1 will be described. Hereinafter, a difference from the tension holding unit 20 in the above embodiment and a difference between tension holding units in the modification examples will be mainly described.

First Modification Example

Figure 8:
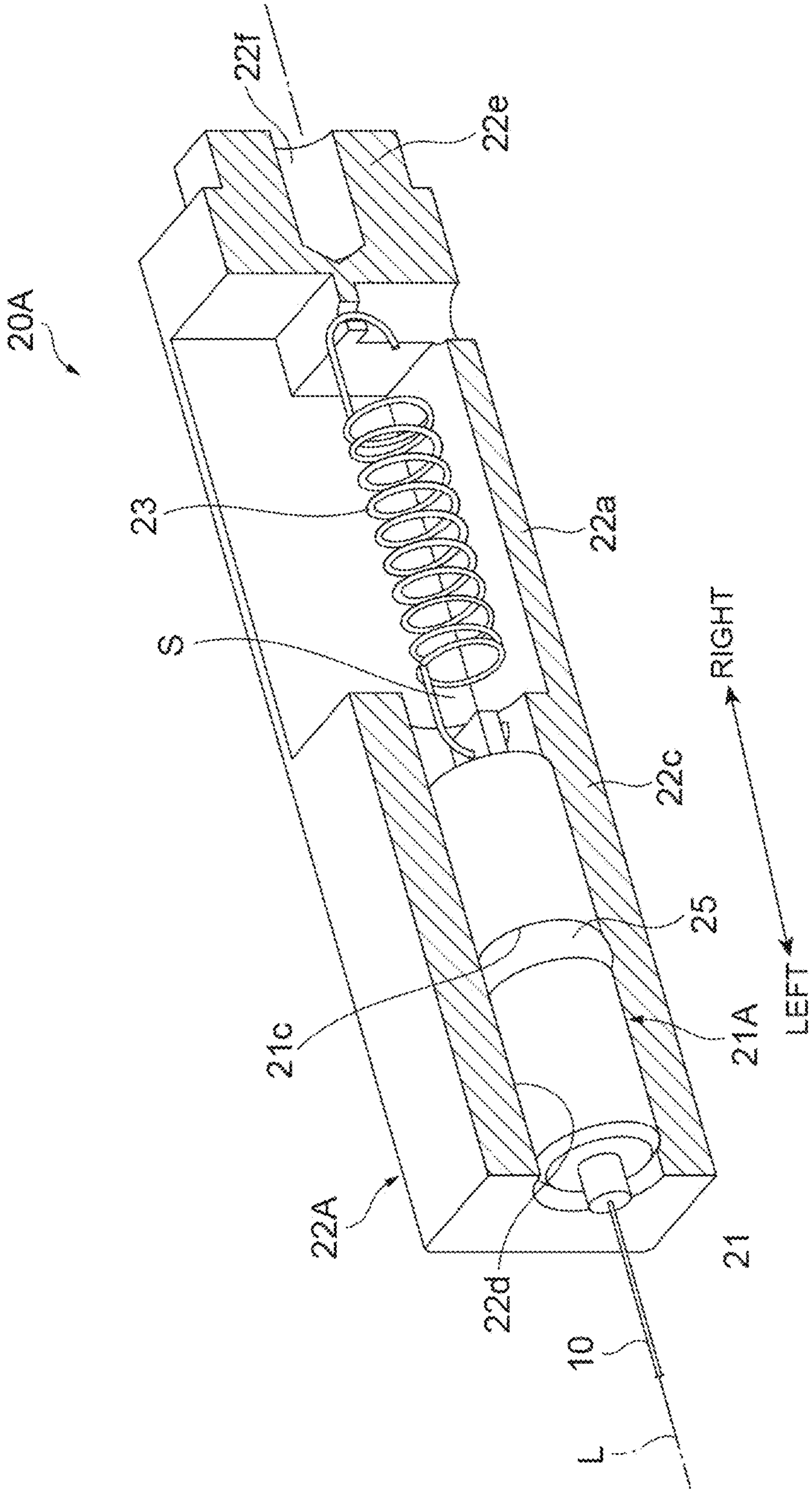
FIG. 8 is a cross-sectional perspective view of a tension holding unit of a first modification example.

As shown in FIG. 8, a tension holding unit 20A in a first modification example includes a movable body 21A, a housing 22A, a spring 23, and an annular elastic body (a power supply path part) 25. The movable body 21A has a circular column shape extending in the left-right direction. The one end of the filament 10 is fixed to an end of the movable body 21A on the left side. The other end of the spring 23 is connected to an end of the movable body 21A on the right side. The movable body 21A is provided on the axis L. Further, the movable body 21A is disposed such that a position of a center of gravity of the movable body 21A is positioned on the axis L. The movable body 21A is formed of a conductive material. The movable body 21A is formed of, for example, a copper alloy, stainless steel, or the like as a material having a good electrical conductivity.

The housing 22A is a box body having an accommodation space S inside. The spring 23 is accommodated in the accommodation space S of the housing 22A. The housing 22A may be constituted by a box part 22*a* having an open surface such that the spring 23 can be accommodated in the accommodation space S. A guide hole 22*d* is provided in a filament side wall 22*c* of the housing 22A. A diameter of the guide hole 22*d* is larger than a diameter of the movable body 21A by a desired value. A length of the guide hole 22*d* in the direction of the axis L is longer than a length of the movable body 21A. The guide hole 22*d* guides the movable body 21A to be movable along the axis L. That is, the housing 22A holds the movable body 21A to be movable along the axis L by the guide hole 22*d*. The housing 22A is formed of a conductive material. The housing 22A is formed of, for example, a copper alloy, stainless steel, or the like as a material having a good electrical conductivity.

The spring 23 is provided on the axis L. The other end of the spring 23 is connected to an end of the movable body 21A on the right side. A connection position between the spring 23 and the movable body 21A is positioned on the axis L. One end of the spring 23 is connected to a power supply side wall 22*e* of the housing 22A. The housing 22A covers the spring 23 such that the spring 23 cannot be seen directly from the filament 10.

The spring 23 applies a tensile force to the movable body 21A such that the movable body 21A moves along the axis L. That is, the spring 23 pulls the movable body 21A in one side direction along the axis L from the connection position to the movable body 21A. As a result, the spring 23 pulls the filament 10 via the movable body 21A by applying a tensile force to the movable body 21A and holds the tension of the filament 10.

The annular elastic body 25 is accommodated in the guide hole 22*d* of the housing 22A. The annular elastic body 25 serves as a power supply path for supplying the electric power supplied to the housing 22A via the power supply line 14 to the movable body 21A. The annular elastic body 25 is formed of an elastic member having an annular shape and conductivity. The annular elastic body 25 is fitted into a recess 21*c* extending over the entire region in a circumferential direction in an outer peripheral surface of the movable body 21A in a cross section in the direction perpendicular to the axis L.

A portion of an outer peripheral edge (one end) of the annular elastic body 25 in a radial direction (a direction perpendicular to the axis L) is in contact with an inner peripheral surface of the guide hole 22*d* of the housing 22A and is electrically connected thereto. A portion of an inner peripheral edge (the other end) of the annular elastic body 25 in the radial direction is in contact with an outer peripheral surface (an inner wall surface of the recess 21*c*) of the movable body 21A and is electrically connected thereto. That is, in the state where the annular elastic body 25 is fitted into the recess 21*c*, a diameter of an outer periphery of the annular elastic body 25 is larger than a diameter of an outer periphery of the movable body 21A, and a diameter of an inner periphery of the annular elastic body 25 is smaller than at least a diameter of an outer periphery of the movable body 21A. As a result, the annular elastic body 25 is electrically connected to the housing 22A and is also electrically connected to the filament 10 via the movable body 21A. The annular elastic body 25 is formed of a material having a better electrical conductivity than the spring 23. That is, an electric resistance value of the spring 23 is larger than an electric resistance value of the annular elastic body 25. The annular elastic body 25 is formed of, for example, a copper alloy or the like as a material having a good electrical conductivity.

In this way, the tension holding unit 20A can maintain the tension of the filament 10 with the tensile force of the spring 23 as in the tension holding unit 20 in the embodiment. Further, in the tension holding unit 20A, the housing 22A and the movable body 21A are connected to each other by the spring 23 and the annular elastic body 25. Further, the annular elastic body 25 is formed of a material having a better electrical conductivity than the spring 23. As a result, the electric power is supplied from the housing 22A to the movable body 21A mainly through the annular elastic body 25 rather than the spring 23. As a result, heat generation of the spring 23 due to energization is curbed, and thus fluctuations in the tensile force, deterioration, or the like of the spring 23 due to the influence of heat is curbed. In this way, the tension holding unit 20A can hold the tension of the filament 10 by the spring 23 while supplying the electric power to the filament 10 through the annular elastic body 25 via the movable body 21A.

As described above, also in a case where the electron beam emission device 1 is provided with the tension holding unit 20A, it is possible to exhibit the same operation and effect as in the case where the electron beam emission device 1 is provided with the tension holding unit 20 in the embodiment.

Second Modification Example

Figure 9:
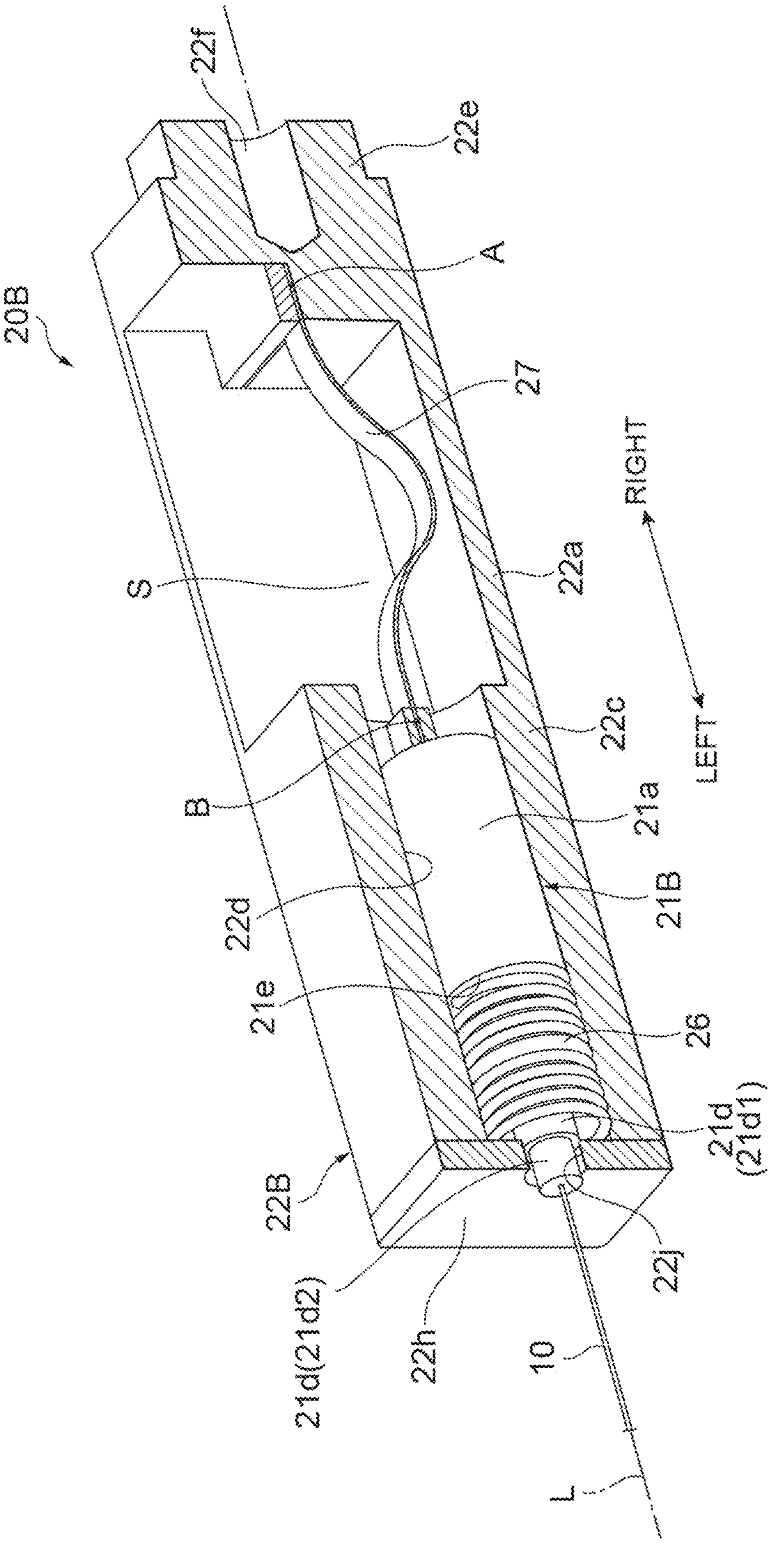
FIG. 9 is a cross-sectional perspective view of a tension holding unit of a second modification example.

As shown in FIG. 9, a tension holding unit 20B in a second modification example includes a movable body 21B, a housing 22B, a spring (a tension holding part) 26, and a foil material (a power supply path part) 27. The movable body 21B is connected to the one end of the filament 10. The movable body 21B has a circular column 21*a* and a small-diameter circular column 21*d*. The small-diameter circular column 21*d* includes a main body 21*d*1 having a diameter smaller than that of the circular column 21*a* and a tip end 21*d*2 having a diameter smaller than that of the main body 21*d*1. The main body 21*d*1 is connected to an end of the circular column 21*a* on the left side, and the tip end 21*d*2 is connected to an end of the main body 21*d*1 on the left side. The one end of the filament 10 is fixed to an end of the tip end 21*d*2 of the small-diameter circular column 21*d* on the left side. The movable body 21B is provided on the axis L. Further, the movable body 21B is disposed such that a position of a center of gravity of the movable body 21B is positioned on the axis L. The movable body 21B is formed of a conductive material. The movable body 21B is formed of, for example, a material such as stainless steel, copper, or a copper alloy.

The housing 22B further includes a housing side spring receiving part (a housing side tension receiving part) 22*h* with respect to the housing 22A (see FIG. 8) in the first modification example. The housing side spring receiving part 22*h* is provided on a surface of the filament side wall 22*c* on a side of the filament 10 (the other side). The housing side spring receiving part 22*h* is provided with a small-diameter hole 22*j* through which the tip end 21*d*2 of the small-diameter circular column 21*d* of the movable body 21B can be inserted. A diameter of the small-diameter hole 22*j* is smaller than a diameter of a guide hole 22*d* and larger than a diameter of the tip end 21*d*2. The housing 22B is formed of a conductive material. The housing 22B is formed of, for example, a material such as stainless steel, copper, or a copper alloy.

The spring 26 is accommodated in the guide hole 22*d* of the housing 22B. The spring 26 is provided on the axis L. The main body 21*d*1 of the small-diameter circular column 21*d* of the movable body 21B passes through the inside of the spring 26. That is, an outer diameter of the spring 26 is smaller than an inner diameter of the guide hole 22*d*, and an inner diameter of the spring 26 is larger than an outer diameter of the main body 21*d*1 of the small-diameter circular column 21*d*. One end of the spring 26 is in contact with an end face of the circular column 21*a* of the movable body 21B on the left side. The other end of the spring 26 is in contact with a surface of the housing side spring receiving part 22*h* on the right side. That is, the end surface of the circular column 21*a* of the movable body 21B on the left side becomes a movable body side spring receiving part (a movable body side tension receiving part) 21*e* with which the spring 26 is in contact. The housing side spring receiving part 22*h* is positioned on a side of the filament 10 from the movable body side spring receiving part 21*e*. The spring 26 is disposed between the movable body side spring receiving part 21*e* and the housing side spring receiving part 22*h*. The housing side spring receiving part 22*h* covers the spring 26 such that the spring 26 cannot be seen directly from the filament 10 (partitions the filament 10 the spring 26 from each other).

The spring 26 is a compression spring. The spring 26 applies a pressing force to the movable body 21B such that the movable body 21B moves along the axis L. That is, the spring 26 presses the movable body 21B in one side direction along the axis L from a contact position with the movable body 21B. The movable body 21B is connected to the one end of the filament 10. As a result, the spring 26 pulls the filament 10 in a right direction via the movable body 21B by applying a pressing force to the movable body 21B and holds the tension of the filament 10. The spring 26 is formed of, for example, a material such as stainless steel or Inconel. The spring 26 may be formed of a material which is different from the filament 10.

The foil material 27 is accommodated in the accommodation space S of the housing 22B. The foil material 27 serves as a power supply path for supplying the electric power supplied to the housing 22B via the power supply line 14 to the movable body 21B. One end of the foil material 27 is connected to the power supply side wall 22*e* of the housing 22B, and the other end of the foil material 27 is connected to the circular column 21*a* of the movable body 21B. As a result, the foil material 27 is electrically connected to the filament 10 via the movable body 21B. The foil material 27 is formed of a material having a better electrical conductivity than the spring 26. That is, an electric resistance value of the spring 26 is larger than an electric resistance value of the foil material 27. The foil material 27 is formed of, for example, copper or the like as a material having a good electrical conductivity and a good flexibility.

The foil material 27 is a thin film shaped member formed of a metal (a metal thin film part). A thickness of the foil material 27 is thinner than a width of the foil material 27, and the width of the foil material 27 is smaller than a length of the foil material 27. The length of the foil material 27 is longer than a length (a length of a straight line along the axis L) from a connection position A between the foil material 27 and the power supply side wall 22*e* to a connection position B between the foil material 27 and the movable body 21B. As a result, even in a case where the movable body 21B moves along the axis L, the foil material 24 can maintain a state in which the power supply side wall 22*e* and the movable body 21B are connected to each other while allowing the movable body 21B to move.

In this way, the tension holding unit 20B can maintain the tension of the filament 10 with the pressing force of the spring 26. Further, a length (a free length) of the spring 26 is such that a pressing force can be applied to the movable body 21B even in a case where a length of the filament 10 becomes longer due to thermal expansion. As a result, the tension holding unit 20B can maintain the tension of the filament 10 with the pressing force of the spring 26 even in a case where the length of the filament 10 changes due to thermal expansion. In this way, a state where the filament 10 is stretched in a straight linear shape by the tension holding unit 20B is maintained.

Further, in the tension holding unit 20B, the housing 22B and the movable body 21B are connected to each other by the spring 26 and the foil material 27. Here, the foil material 27 is formed of a material having a better electrical conductivity than the spring 26. As a result, the electric power is supplied from the power supply side wall 22*e* to the movable body 21B mainly through the foil material 27 rather than the spring 26. As a result, heat generation of the spring 26 due to energization is curbed, and thus fluctuations in the pressing force or the like of the spring 26 due to the influence of heat is curbed. In this way, the tension holding unit 20B can hold the tension of the filament 10 by the spring 26 while supplying the electric power to the filament 10 through the foil material 27 via the movable body 21B.

As described above, also in a case where the electron beam emission device 1 is provided with the tension holding unit 20B, it is possible to exhibit the same operation and effect as in the case where the electron beam emission device 1 is provided with the tension holding unit 20 in the embodiment.

As described above, in the electron beam emission device 1 (the filament unit 2) provided with the tension holding unit 20B, the filament 10, the movable body 21B, and the spring 26 are provided on the same axis L. Therefore, the electron beam emission device 1 can easily apply the pressing force of the spring 26 to the filament 10 via the movable body 21B in the direction of the axis L. As a result, even in a case where the pressing force of the spring 26 is applied, axial deviation (deviation from the axis L) of the filament 10 is curbed. In this way, the electron beam emission device 1 provided with the tension holding unit 20B can appropriately apply the pressing force of the spring 26 to the filament 10 to curb the axial deviation of the filament 10. As a result, it is possible to obtain more uniform electron discharge distribution.

The spring 26 applies a pressing force to the movable body 21B such that the movable body 21B moves along the axis L. In this case, the electron beam emission device 1 provided with the tension holding unit 20B can further curb the axial deviation of the filament 10 in a case where the pressing force of the spring 26 is applied.

The movable body 21B is disposed such that a position of a center of gravity of the movable body 21B is positioned on the axis L. In this case, even in a case where the pressing force of the spring 26 is applied, the movable body 21B swinging due to action of a moment is curbed. As a result, the electron beam emission device 1 provided with the tension holding unit 20B can further curb the axial deviation of the filament 10.

The filament 10 and the spring 26 are formed of different members. In this case, the electron beam emission device 1 provided with the tension holding unit 20B can curb the conduction of heat from the filament 10 to the spring 26 and can curb the heating of the spring 26.

The spring 26 is accommodated in the guide hole 22*d* of the housing 22B. In this case, the electron beam emission device 1 provided with the tension holding unit 20B can curb the influence of the radiant heat from the filament 10 on the spring 26. As a result, the electron beam emission device 1 provided with the tension holding unit 20B can curb fluctuations in the pressing force of the spring 26 due to the influence of heat and deterioration due to heat and can stably hold the tension of the filament 10.

The small-diameter hole 22*j* provided in the housing side spring receiving part 22*h* has a smaller diameter than the guide hole 22*d* and has a diameter sufficient for the small-diameter circular column 21*d* to pass therethrough. Further, the housing side spring receiving part 22*h* covers the spring 26 such that the spring 26 cannot be seen directly from the filament 10. In this case, the electron beam emission device 1 provided with the tension holding unit 20B can prevent the electrons discharged from the filament 10 from directly hitting the spring 26 and can curb heating deterioration and damage caused by the collision of the electrons.

Third Modification Example

Figure 10:
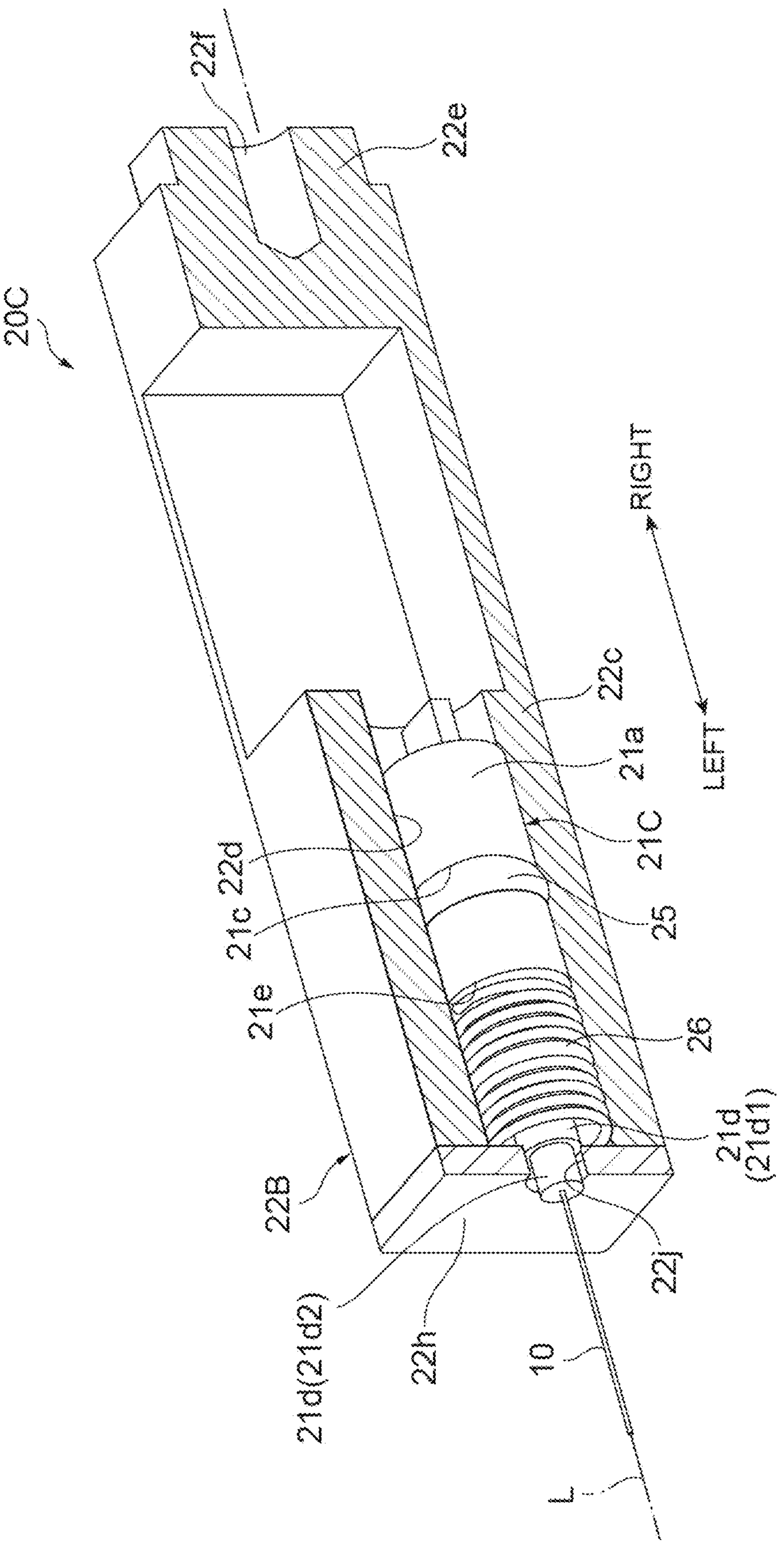
FIG. 10 is a cross-sectional perspective view of a tension holding unit of a third modification example.

As shown in FIG. 10, a tension holding unit 20C in a third modification example is configured to include the annular elastic body 25 of the tension holding unit 20A (see FIG. 8) in the first modification example instead of the foil material 27 in the configuration of the tension holding unit 20B (see FIG. 9) in the second modification example. Specifically, the tension holding unit 20C includes a movable body 21C, a housing 22B, an annular elastic body (a power supply path part) 25, and a spring 26. A recess 21*c* is provided in an outer peripheral surface of a circular column 21*a* of the movable body 21C. The annular elastic body 25 is fitted into the recess 21*c* of the circular column 21*a*.

The tension holding unit 20C can maintain the tension of the filament 10 with the pressing force of the spring 26 as in the tension holding unit 20B in the second modification example. Further, in the tension holding unit 20C, the housing 22B and the movable body 21C are connected to each other by the annular elastic body 25 and spring 26. Here, the annular elastic body 25 is formed of a material having a better electrical conductivity than the spring 26. As a result, the electric power is supplied from the housing 22B to the movable body 21C mainly through the annular elastic body 25 rather than the spring 26. As a result, heat generation of the spring 26 due to energization is curbed, and thus fluctuations in the pressing force or the like of the spring 26 due to the influence of heat is curbed. In this way, the tension holding unit 20C can hold the tension of the filament 10 by the spring 26 while supplying the electric power to the filament 10 through the annular elastic body 25 via the movable body 21C.

As described above, also in a case where the electron beam emission device 1 is provided with the tension holding unit 20C, it is possible to exhibit the same operation and effect as in the case where the electron beam emission device 1 is provided with the tension holding unit 20B in the second modification example.

Fourth Modification Example

Figure 11:
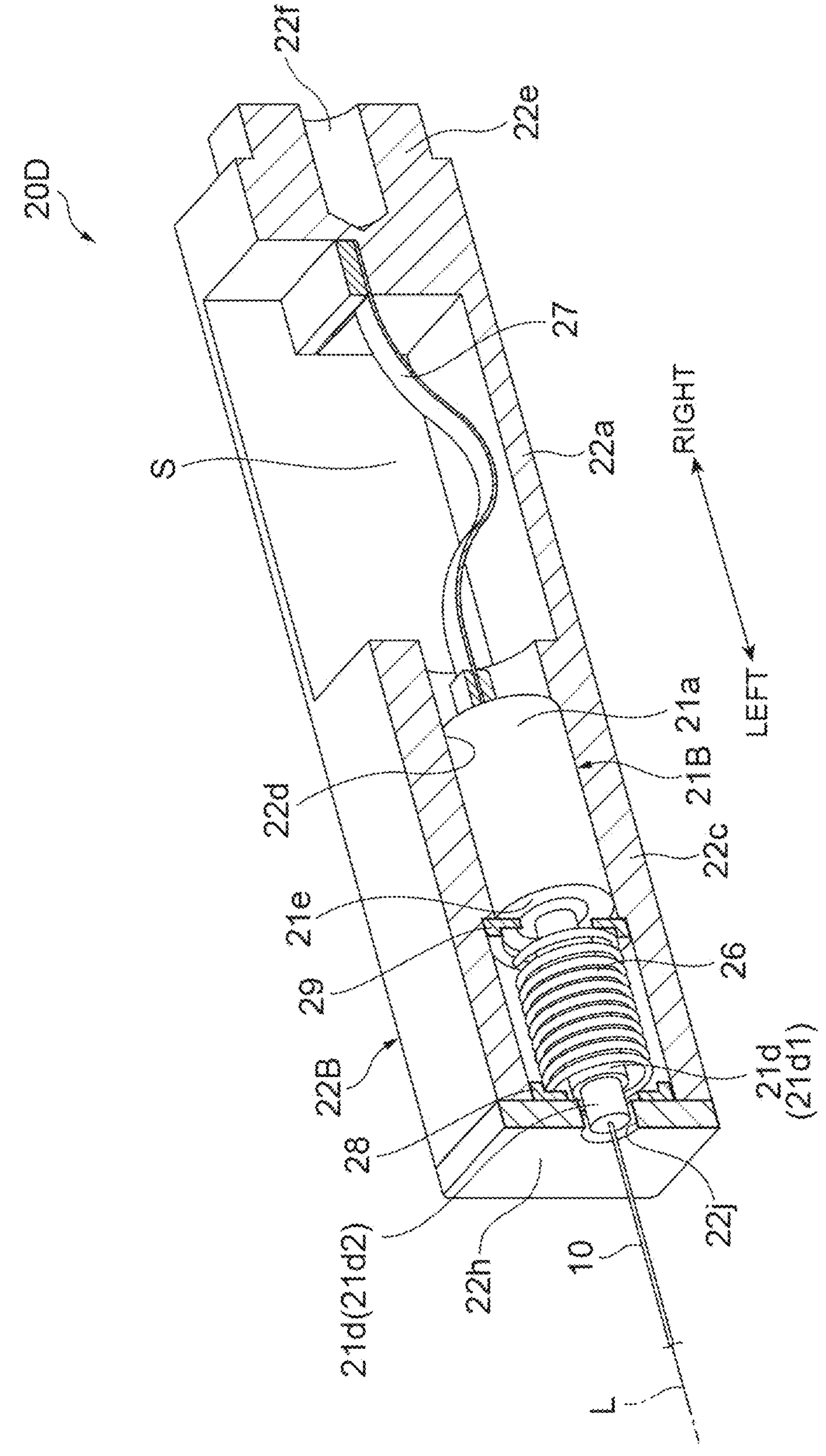
FIG. 11 is a cross-sectional perspective view of a tension holding unit of a fourth modification example.

As shown in FIG. 11, a tension holding unit 20D in a fourth modification example further includes an insulation ring (an insulation member) 28 and an insulation ring (and insulation member) 29 with respect to the configuration of the tension holding unit 20B (see FIG. 9) in the second modification example. That is, the tension holding unit 20D includes a movable body 21B, a housing 22B, a spring 26, a foil material 27, an insulation ring 28, and an insulation ring 29.

The insulation ring 28 is disposed between the spring 26 and a housing side spring receiving part 22*h*. The insulation ring 28 electrically insulates the housing 22B and the spring 26 from each other. The insulation ring 28 is formed of a material having a less conductivity than the spring 26. An outer edge of the insulation ring 28 projects toward the spring 26 in a direction along the axis L to surround an outer peripheral portion of the spring 26. As a result, the insulation ring 28 can prevent the outer peripheral portion of the spring 26 from coining into contact with the inner peripheral surface of the guide hole 22*d*. Further, the spring 26 is also positioned in the direction perpendicular to the axis L by an inner peripheral portion of the insulation ring 28, and thus the contact between the spring 26 and the small-diameter circular column 21*d* of the movable body 21B is also curbed.

Similarly, the insulation ring 29 is disposed between the movable body side spring receiving part 21*e* of the circular column 21*a* of the movable body 21B and the spring 26. The insulation ring 29 electrically insulates the movable body 21B and the spring 26 from each other. The insulation ring 29 is formed of a material having a less conductivity than the spring 26. An outer edge of the insulation ring 29 projects toward the spring 26 in a direction along the axis L to surround an outer peripheral portion of the spring 26. As a result, the insulation ring 29 can prevent the outer peripheral portion of the spring 26 from coining into contact with the inner peripheral surface of the guide hole 22*d*. Further, the spring 26 is also positioned in the direction perpendicular to the axis L by an inner peripheral portion of the insulation ring 29, and thus the contact between the spring 26 and the small-diameter circular column 21*d* of the movable body 21B is also curbed.

The tension holding unit 20D may be configured to include only any one of the insulation ring 28 and the insulation ring 29.

As described above, the tension holding unit 20D in the fourth modification example can further curb the flow of electricity to the spring 26 by providing the insulation rings 28 and 29. As a result, the tension holding unit 20D can further curb heat generation of the spring 26 due to energization.

Fifth Modification Example

Figure 12:
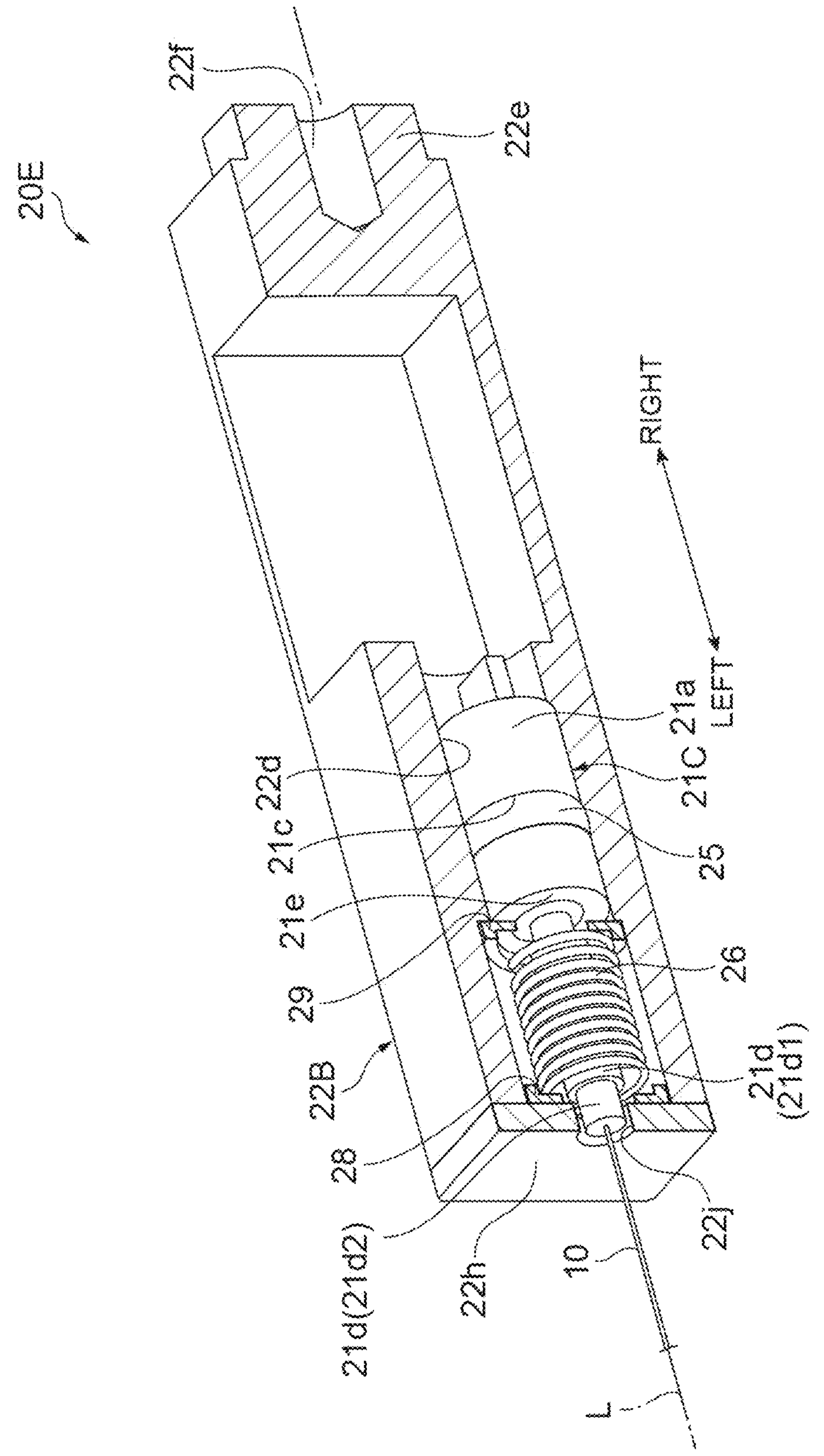
FIG. 12 is a cross-sectional perspective view of a tension holding unit of a fifth modification example.

As shown in FIG. 12, a tension holding unit 20E in a fifth modification example further includes an insulation ring (an insulation member) 28 and an insulation ring (and insulation member) 29 with respect to the configuration of the tension holding unit 20C (see FIG. 10) in the third modification example. That is, the tension holding unit 20E includes a movable body 21C, a housing 22B, an annular elastic body 25, a spring 26, an insulation ring 28, and an insulation ring 29. The insulation rings 28 and 29 have the same configuration as the insulation rings 28 and 29 in the fourth modification example.

As described above, the tension holding unit 20E in the fifth modification example can further curb the flow of electricity to the spring 26 by providing the insulation rings 28 and 29. As a result, the tension holding unit 20E can further curb heat generation of the spring 26 due to energization.

Here, for example, even in the tension holding unit 20 in the embodiment described with reference to FIGS. 6 and 7, it is possible to further curb the flow of electricity to the spring 23. Specifically, in the connection part 21*b* of the tension holding unit 20 shown in FIGS. 6 and 7, a portion to which the spring 23 is connected (a portion to be hooked) may be made of an insulation material (for example, ceramic or the like). Alternatively, the portion of the connection part 21*b* to which the spring 23 is connected may be subjected to insulation coating. Further, the spring 23 of the tension holding unit 20 may be subjected to insulation coating. Similarly, for example, in the movable body 21A of the tension holding unit 20A of the first modification example described with reference to FIG. 8, a portion to which the spring 23 is connected (a portion to be hooked) may be made of an insulation material (for example, ceramic or the like). Alternatively, the portion of the movable body 21A to which the spring 23 is connected may be subjected to insulation coating. Further, the spring 23 of the tension holding unit 20A may be subjected to insulation coating. Even in these cases, the tension holding units 20 and 20A can further curb the flow of electricity to the spring 23 and can further curb heat generation of the spring 23 due to energization.

Sixth Modification Example

Figure 13:
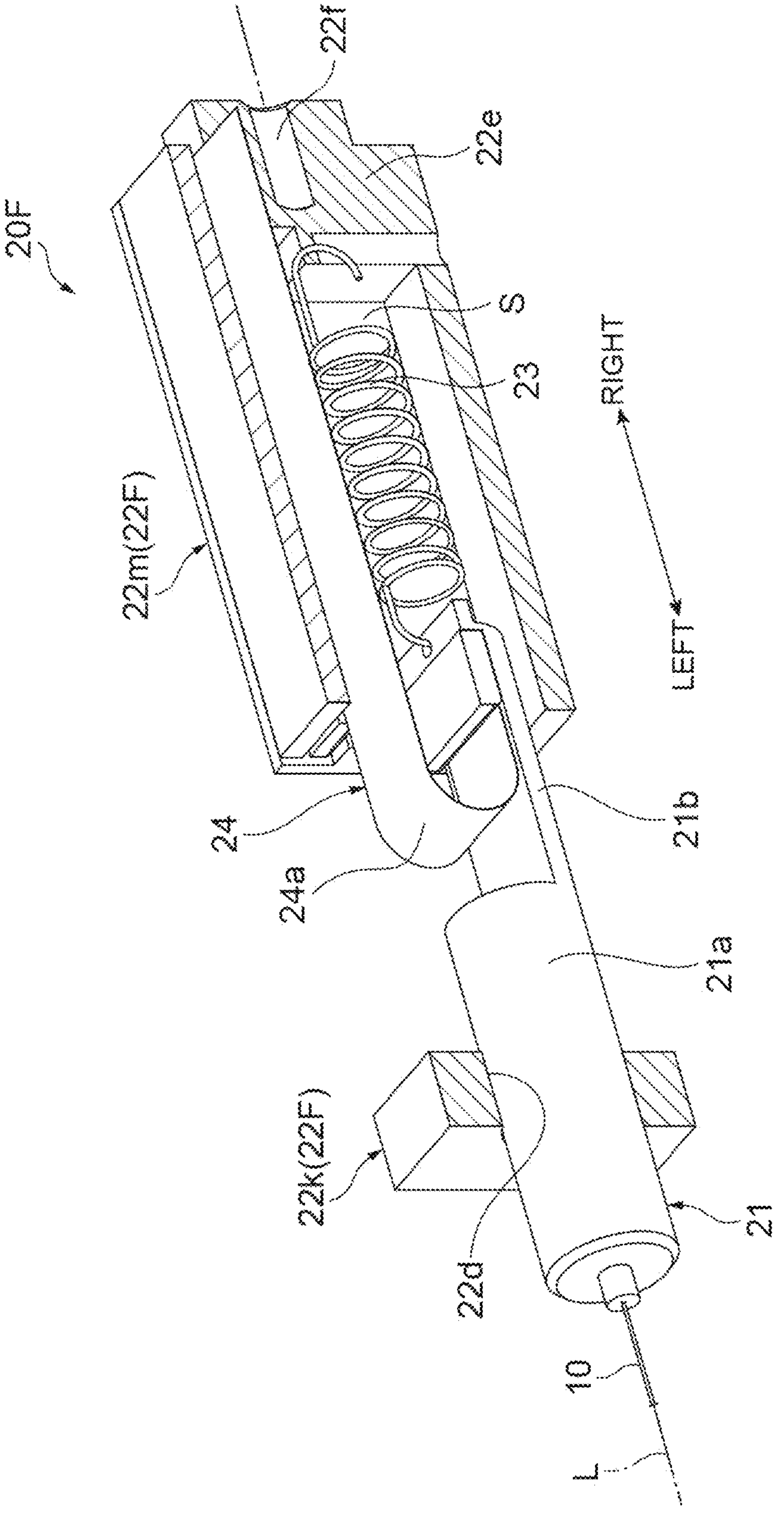
FIG. 13 is a cross-sectional perspective view of a tension holding unit of a sixth modification example.

As shown in FIG. 13, in a tension holding unit 20F in a sixth modification example, the housing 22 of the tension holding unit 20 in the embodiment is divided into two. Specifically, the tension holding unit 20F includes a movable body 21, a housing 22F, a spring 23, and a foil material 24. The housing 22F includes a first housing 22*k* and a second housing 22*m*.

The first housing 22*k* is provided with the guide hole 22*d* through which the circular column 21*a* of the movable body 21 passes. The second housing 22*m* has the accommodation space S for accommodating the spring 23 and a portion of the foil material 24 on a side of the power supply side wall 22*e*. The first housing 22*k* and the second housing 22*m* are attached to the main frame 11 of the filament unit 2 via an insulation material. That is, the first housing 22*k* and the second housing 22*m* are electrically insulated from each other.

As described above, also in a case where the electron beam emission device 1 is provided with the tension holding unit 20F, it is possible to exhibit the same operation and effect as in the case where the electron beam emission device 1 is provided with the tension holding unit 20 in the embodiment. Further, the tension holding unit 20F can supply the electric power to the movable body 21 from the power supply side wall 22*e* via the foil material 24 without directly supplying the electric power to the movable body 21 from the inner peripheral surface of the guide hole 22*d* provided in the first housing 22*k*. In this way, the tension holding unit 20F is not configured to supply the electric power via the members sliding on each other, and thus it is possible to supply the electric power to the movable body 21 more reliably.

Seventh Modification Example

Figure 14:
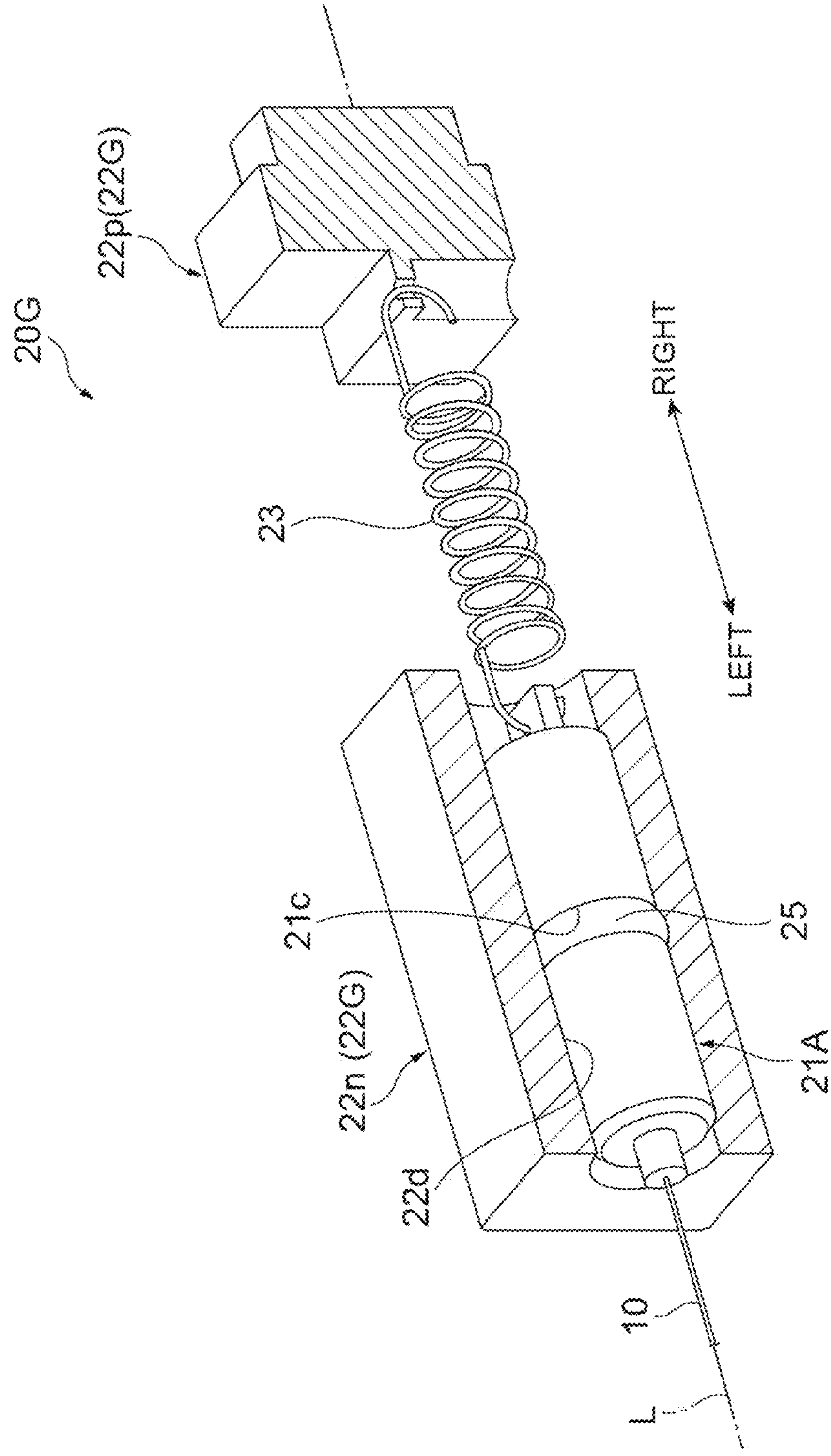
FIG. 14 is a cross-sectional perspective view of a tension holding unit of a seventh modification example.

As shown in FIG. 14, in a tension holding unit 20G in a seventh modification example, the housing 22A of the tension holding unit 20A in the first modification example is divided into two. Specifically, the tension holding unit 20G includes a movable body 21A, a housing 22G, a spring 23, and an annular elastic body 25. The housing 22G includes a first housing 22*n* and a second housing 22*p*.

The first housing 22*n* is provided with the guide hole 22*d* through which the movable body 21A passes. The one end of the spring 23 is connected to an end of the movable body 21A on the right side. The other end of the spring 23 is connected to the second housing 22*p*. The first housing 22*n* and the second housing 22*p* are attached to the main frame 11 of the filament unit 2 via an insulation material. That is, the first housing 22*n* and the second housing 22*p* are electrically insulated from each other.

The end of the power supply line 14 is connected to the first housing 22*n*. In the tension holding unit 20G, the electric power is supplied from the first housing 22*n* to the filament 10 via the annular elastic body 25 and the movable body 21A. As a result, heat generation of the spring 23 due to energization is curbed, and thus fluctuations in the tensile force or the like of the spring 23 due to the influence of heat is curbed. In this way, the tension holding unit 20G can hold the tension of the filament 10 by the spring 23 while supplying the electric power to the filament 10 through the annular elastic body 25 via the movable body 21A.

Example of Filament Fixing Method

Figure 15:
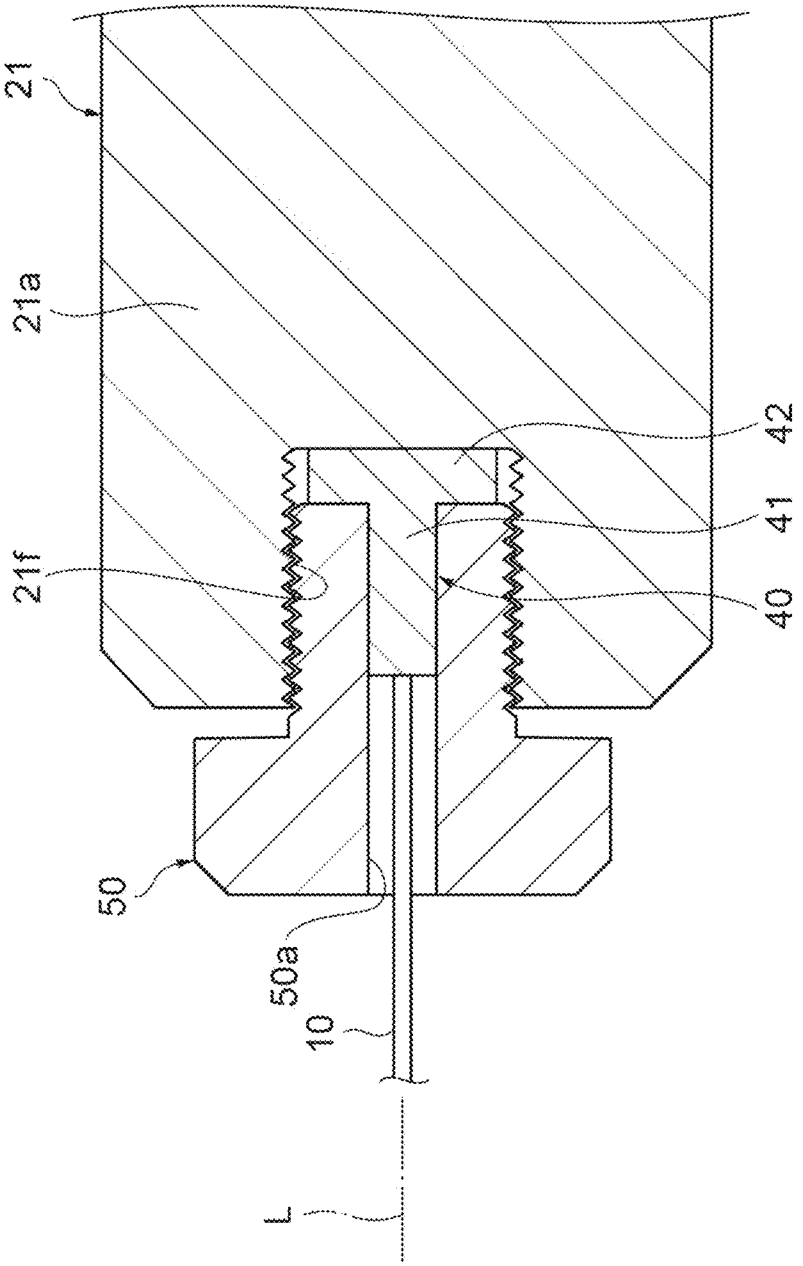
FIG. 15 is a cross-sectional view showing an example of an attachment structure of a filament to a movable body.

Next, an example of a method of fixing the filament 10 to the tip end of the movable body 21 of the tension holding unit 20 in the embodiment will be described. The method of fixing the filament 10, which will be described below, is also applicable to the various modification examples of the tension holding unit described above. As shown in FIG. 15, a bolt hole 21*f* extending along the axis L is provided in the tip end surface (the other end surface) of the circular column 21*a* of the movable body 21. A filament fixing member 40 is attached to the tip end (the one end side) of the filament 10. The filament fixing member 40 includes a tubular part 41 and a flange 42. The tip end of the filament 10 is inserted into the tubular part 41 and fixed thereto. Here, the tubular part 41 may be attached to the filament 10 by the tip end of the filament 10 being placed on an inner peripheral surface thereof by caulking. The flange 42 protrudes outward from the outer peripheral surface of the end of the tubular part 41 on a side of the movable body 21.

The filament fixing member 40 is fixed to the tip end of the movable body 21 by a perforated bolt 50. The perforated bolt 50 is provided with a through hole 50*a* extending in an axial direction of the perforated bolt 50. The tubular part 41 of the filament fixing member 40 and a part of the filament 10 are inserted into the through hole 50*a* such that the flange 42 comes into contact with the tip end of the perforated bolt 50. The perforated bolt 50 is attached to the bolt hole 21*f* of the circular column 21*a* in a state where the tubular part 41 or the like is inserted into the through hole 50*a*. The filament fixing member 40 attached to the tip end of the filament 10 is fixed to the tip end of the circular column 21*a* when the flange 42 is sandwiched between the tip end of the perforated bolt 50 and a bottom portion of the bolt hole 21*f* of the circular column 21*a*.

In this way, in the configuration shown in FIG. 15, the filament 10 can be easily attached to and detached from the movable body 21 using the perforated bolt 50. As a result, in this configuration, it is easy to replace the filament 10. Further, according to this configuration, the movable body 21 can easily pull the filament 10 in the direction of the axis L while curbing the axial deviation.

Although the embodiment and various modification examples of the present disclosure have been described above, the present disclosure is not limited to the above embodiment and various modification examples. The configurations which will be described below are applicable to all the embodiment and various modification examples as much as possible. In the tension holding unit 20 of the embodiment, if the spring 23 may not be a configuration in which the spring 23 pulls the movable body 21 in a direction along the axis L as long as a configuration in which, for example, the moving direction of the movable body 21 is guided the guide hole 22*d* is provided. For example, even if the spring 23 is configured to pull the movable body 21 in a direction slightly deviated from the axis L, the moving direction of the movable body 21 only has to be guided in a direction of the axis L by the guide hole 22*d*. In the tension holding unit 20 of the embodiment, the movable body 21 is not limited to that the position of a center of gravity of the movable body 21 is positioned on the axis L.

In the tension holding unit 20 of the embodiment, the spring 23 is not limited to being accommodated in the accommodation space S of the housing 22. For example, in a case where the housing 22 does not have the accommodation space S, the spring 23 may be configured not to be accommodated in the accommodation space S. In the tension holding unit 20 of the embodiment, the spring 23 is not limited to the configuration in which the spring 23 is disposed not to be directly seen from the filament 10. In the tension holding unit 20 of the embodiment, the movable body 21 may not be guided by the guide hole 22*d* of the housing 22. In a case where the movable body 21 is guided by the guide hole 22*d* of the housing 22, the shape of the movable body 21 and the guide hole 22*d* is not limited to the circular column shape extending along the axis L. The movable body 21 and the guide hole 22*d* may have a shape other than the circular column shape, for example, a polygonal shape.

The filament 10 is not limited to the straight linear member in all parts. For example, the filament 10 may have a coiled part having a coiled shape. In this case, the filament 10 can hold the tension of the filament 10 even by its own coiled part. In this way, the electron beam emission device can have a function of holding tension with respect to the filament 10.

Further, the filament unit 2 may be used as an electron beam generation source provided in an X-ray emission device that emits X-rays. In a case where the filament unit 2 is used as an electron beam generation source of an X-ray emission device, the X-ray emission device further includes a main body that accommodates the filament unit 2, an X-ray target (for example, tungsten, molybdenum, or the like) as an X-ray generation part that generates X-rays when electrons are incident from the filament unit 2, and an X-ray extraction part for extracting X-rays to the outside of the main body. In this case, as an example of the X-ray extraction part, the window 9 shown in FIG. 1 may be changed to a window for X-ray emission constituted by a window material having a high X-ray permeability (for example, beryllium, diamond, or the like) and the X-ray target provided on a surface of the window material on a side of the vacuum space R. As a result, the electron beams EB emitted from the filament unit 2 can be incident on the X-ray target, and the X-rays can be emitted from the X-ray target.

At least a part of the above-described embodiment and various modification examples may be arbitrarily combined.

REFERENCE SIGNS LIST

1 Electron beam emission device
2 Filament unit (electron beam generation source)
10 Filament (electron discharge part)
11 Main frame (frame)
20, 20A to 20G Tension holding unit
21, 21A to 21C Movable body
22, 22A, 22B, 22F, 22G housing (support part, housing part)
22*d* Guide hole (movable part holding part)
23, 26 Spring (tension holding part)
L Axis
S Accommodation space (internal space)

The invention claimed is:

1. An electron beam generation source comprising:

an electron discharge part extending on a desired axis and configured to discharge electrons;

a movable part connected to one end of the electron discharge part;

a support part configured to support the movable part to be movable along the axis; and a tension holding part configured to hold tension of the electron discharge part by applying a pressing force or a tensile force to the movable part, wherein the movable part and the tension holding part are disposed on the axis, the support part includes a housing part having an internal space for accommodating the tension holding part inside, the housing part includes a movable part holding part that extends along the axis and holds the movable part to be movable along the axis, the movable part holding part is a through hole extending along the axis and having a circular column shape, and the tension holding part is arranged on the opposite side of the end to which the electron discharge part is connected in the movable part.

2. The electron beam generation source according to claim 1, wherein the tension holding part applies the pressing force or the tensile force to the movable part such that the movable part moves along the axis.

3. The electron beam generation source according to claim 1, wherein the movable part is disposed such that a position of a center of gravity of the movable part is positioned on the axis.

4. The electron beam generation source according to claim 1, wherein the electron discharge part and the tension holding part are made of different members.

5. The electron beam generation source according to claim 1, wherein the housing part covers the tension holding part such that the tension holding part cannot be directly seen from the electron discharge part.

6. The electron beam generation source according to claim 1, wherein the electron discharge part has a straight linear shape.

7. The electron beam generation source according to claim 1, wherein the electron discharge part has a coiled part having a coiled shape.

8. The electron beam generation source according to claim 1, further comprising a frame configured to support the other end of the electron discharge part and the tension holding part.

9. An electron beam emission device comprising:

the electron beam generation source according to claim 1;

a main body configured to accommodate the electron beam generation source; and an electron extraction part configured to extract electrons from the electron beam generation source to the outside of the main body.

10. An X-ray emission device comprising:

the electron beam generation source according to claim 1;

a main body configured to accommodate the electron beam generation source;

an X-ray generation part configured to generate X-rays when electrons are incident from the electron beam generation source; and an X-ray extraction part configured to extract the X-rays to the outside of the main body.

* * * * *